(12) United States Patent
Liu et al.

(10) Patent No.: US 9,807,618 B2
(45) Date of Patent: Oct. 31, 2017

(54) PERFORMANCE ENHANCEMENTS FOR FREQUENCY REUSE AND TIME DIVISION MULTIPLEXING IN A LICENSED ASSISTED ACCESS SYSTEM

(71) Applicant: QUALCOMM Incorporated, San Diego, CA (US)

(72) Inventors: Zhengwei Liu, San Diego, CA (US); Xiaoxia Zhang, San Diego, CA (US); Jordan Kulcsar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/171,191

(22) Filed: Jun. 2, 2016

(65) Prior Publication Data

US 2016/0360420 A1 Dec. 8, 2016

Related U.S. Application Data

(60) Provisional application No. 62/170,641, filed on Jun. 3, 2015.

(51) Int. Cl.
| | |
|---|---|
| *H04W 16/14* | (2009.01) |
| *H04W 74/08* | (2009.01) |
| *H04W 24/02* | (2009.01) |
| *H04W 72/08* | (2009.01) |
| *H04L 5/00* | (2006.01) |

(Continued)

(52) U.S. Cl.
CPC ........... *H04W 16/14* (2013.01); *H04L 5/0057* (2013.01); *H04W 24/02* (2013.01); *H04W 72/082* (2013.01); *H04W 72/085* (2013.01); *H04W 74/0816* (2013.01); *H04W 88/02* (2013.01); *H04W 88/08* (2013.01)

(58) Field of Classification Search
CPC ............ H04W 16/14; H04W 74/0816; H04W 72/082; H04W 72/085; H04W 24/02; H04W 88/08; H04W 88/02; H04L 5/0057
See application file for complete search history.

(56) References Cited

U.S. PATENT DOCUMENTS

| | | | |
|---|---|---|---|
| 2014/0106686 A1* | 4/2014 | Higgins | H04B 1/40 455/78 |
| 2015/0049715 A1* | 2/2015 | Yerramalli | H04L 5/1469 370/329 |

(Continued)

OTHER PUBLICATIONS

International Search Report and Written Opinion—PCT/US2016/035782—ISA/EPO—Aug. 25, 2016.

(Continued)

*Primary Examiner* — Brandon Miller
(74) *Attorney, Agent, or Firm* — Harrity & Harrity, LLP

(57) ABSTRACT

Techniques and apparatuses for wireless communication are described herein. According to some possible aspects, a base station may determine a random number to be used in association with performing a clear channel assessment (CCA) in a licensed assisted access (LAA) network. The base station may determine the random number in coordination with one or more other random numbers determined by one or more other base stations. The base station may determine, based on the random number, a time to perform the CCA to reduce or prevent conflicts with the one or more other base stations.

30 Claims, 30 Drawing Sheets

(51) Int. Cl.
*H04W 88/08* (2009.01)
*H04W 88/02* (2009.01)

(56) References Cited

U.S. PATENT DOCUMENTS

| | | | | |
|---|---|---|---|---|
| 2015/0071060 A1* | 3/2015 | Bhushan | ............... | H04W 74/08 370/230 |
| 2015/0098397 A1* | 4/2015 | Damnjanovic | ....... | H04W 74/08 370/329 |
| 2015/0110065 A1* | 4/2015 | Gaal | .................... | H04W 16/14 370/330 |
| 2015/0146680 A1* | 5/2015 | Luo | ....................... | H04L 5/0035 370/330 |
| 2016/0135212 A1* | 5/2016 | Wong | ................... | H04W 16/14 370/329 |
| 2016/0309354 A1* | 10/2016 | Yerramalli | ............ | H04W 24/08 |
| 2016/0309498 A1* | 10/2016 | Luo | .................... | H04W 72/1268 |

OTHER PUBLICATIONS

Qualcomm Incorporated: "Further Details on PHY Layer Options for LAA", 3GPP Draft; R1-152791—Further Details on PHY Layer Options for LAA, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015 May 24, 2015 (May 24, 2015), XP050973354, Retrieved from the Internet: URL:http://www.3gpp.org/ftp/Meetings_3GPP%20SYNC/RAN1/Docs/ retrieved on May 24, 2015].

Sharp: "Coexistence Evaluation Results for DL Only LAA in Outdoor Scenario", 3GPP Draft; R1-151011, 3rd Generation Partnership Project (3GPP), Mobile Competence Centre; 650, Route Des Lucioles ; F-06921 Sophia-Antipolis Cedex; France, vol. RAN WG1, No. Paris, France; Mar. 25, 2015-Mar. 26, 2015 Mar. 20, 2015 (Mar. 20, 2015), XP050951476, Retrieved from the Internet: URL:http://www.3gpp.org/ftp/tsg_ran/WG1_RL1/TSGR1_AH_LTE_LAA_1503/Docs/ [retrieved on Mar. 20, 2015].

* cited by examiner

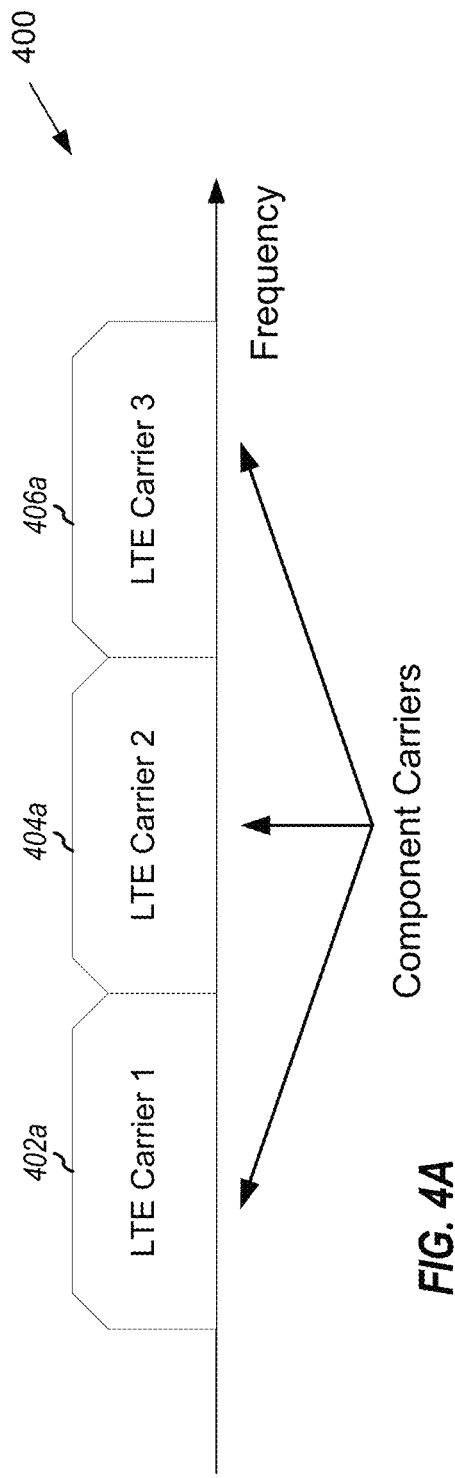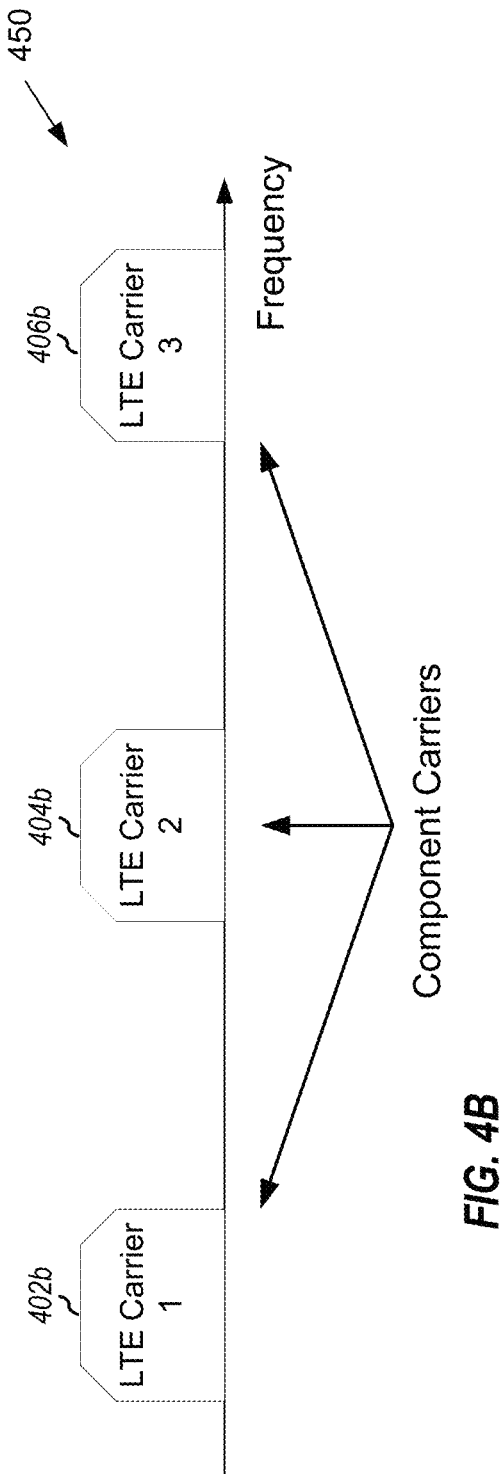
FIG. 4A
FIG. 4B

PERFORMANCE ENHANCEMENTS FOR FREQUENCY REUSE AND TIME DIVISION MULTIPLEXING IN A LICENSED ASSISTED ACCESS SYSTEM

CLAIM OF PRIORITY UNDER 35 U.S.C. §119

The present Application for Patent claims priority to Provisional Application No. 62/170,641 entitled "Performance enhancements for frequency reuse and time division multiplexing in a licensed assisted access system" filed Jun. 3, 2015, which is assigned to the assignee hereof and hereby expressly incorporated by reference herein.

TECHNICAL FIELD

Aspects of the present disclosure relate generally to wireless communication systems, and more particularly, to method for controlling downlink data rate in a licensed assisted access (LAA) network.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of access points that can support communication for a number of mobile devices, such as, for example, laptops, cell phones, PDAs, tablets, etc. A wireless access point may utilize licensed assisted access to leverage unlicensed frequency spectrum in order to provide higher data rates and increased bandwidth to its associated mobile devices.

SUMMARY

Methods, apparatus, and systems for enhancing the performance of a licensed assisted access (LAA) system are described in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for wireless communication may be provided. The method may include determining a random number to be used in association with performing a clear channel assessment (CCA) in a licensed assisted access (LAA) network and determining, based on the random number, a time to perform the CCA to reduce or prevent conflicts with one or more other base stations. The random number may be determined in coordination with one or more other random numbers determined by the one or more other base stations. In a further aspect, the method may include modifying the random number using an offset value and determining the time to perform the CCA based on modifying the random number using the offset value. In a further aspect, the method may include adding an offset value to the random number or subtracting the offset value from the random number. In a further aspect, the method may include adding an offset value to the random number for a first frame and subtracting the offset value from the random number for a second frame. In a further aspect, the base station and the one or more other base stations may be within communication range of a same user equipment.

In a further aspect, the method may include selecting a number set from a plurality of number sets and determining the random number based on the number set. Each number set in the plurality of number sets may include a unique group of numbers. In a further aspect, the number set may be selected based on an identification number corresponding to the base station. In a further aspect, the method may include determining the random number by selecting the random number from one of a plurality of sets of numbers that each includes a unique number at a certain index of each of the plurality of sets of numbers. In a further aspect, the method may include receiving information that identifies the random number from at least one of the one or more other base stations. In a further aspect, the method may include detecting a channel quality indicator (CQI) degradation event and maintaining a downlink data rate, despite detecting the CQI degradation event, when one or more criteria are satisfied. In a further aspect, the method may include receiving, from a user equipment, an indication that the user equipment is undergoing interference and maintaining the downlink data rate based on the indication that the user equipment is undergoing interference.

In related aspects, an apparatus for wireless communication may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities or base stations of various types used for wireless communications. Similarly, an article of manufacture may be provided, including a non-transitory computer-readable medium storing instructions that, when executed by a processor, causes a wireless communication apparatus to perform the methods and aspects of the methods as summarized above.

All of the operations of the foregoing methods may be performed by a network entity or entities of a wireless communication system(s), using components as described in more detail elsewhere herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4A discloses a contiguous carrier aggregation type.

FIG. 4B discloses a non-contiguous carrier aggregation type.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
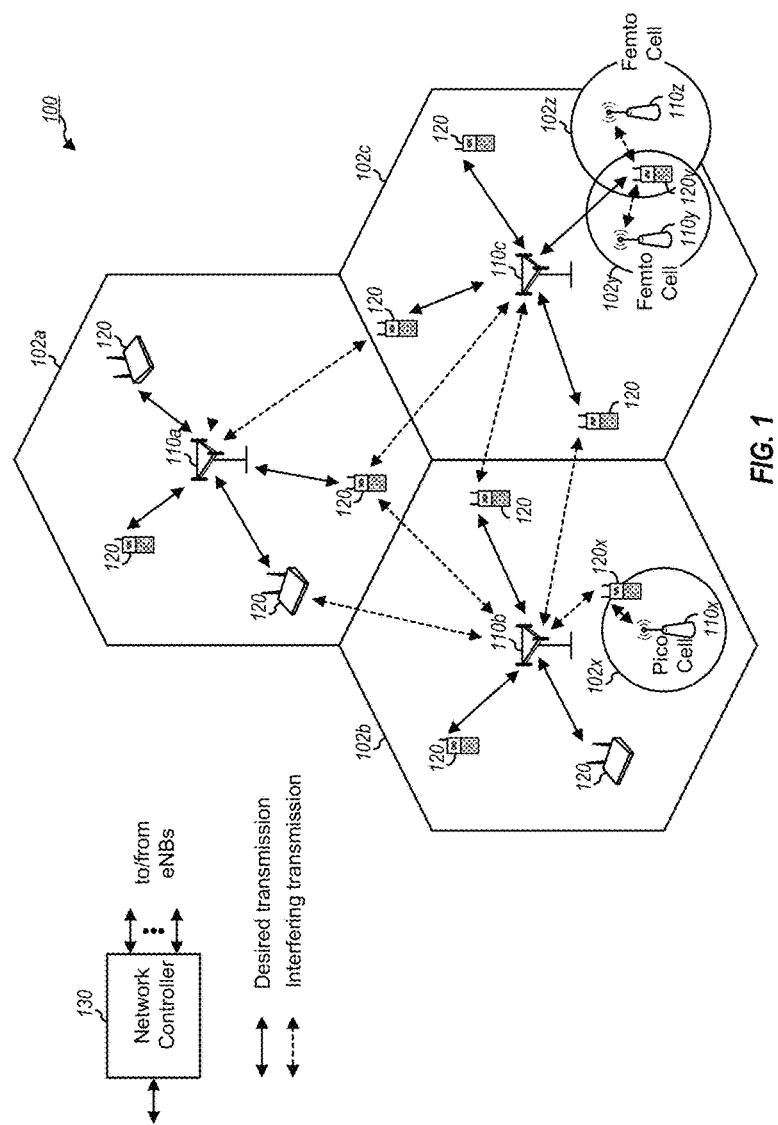
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. Broadcast multicast operations may require synchronization of base stations within a defined area, but the present technology is not limited thereby. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a node, a station, etc. A UE may be a cellular phone, a personal digital assistant (PDA), a wireless modem, a wireless communication device, a handheld device, a laptop computer, a cordless phone, a wireless local loop (WLL) station, or other mobile devices. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
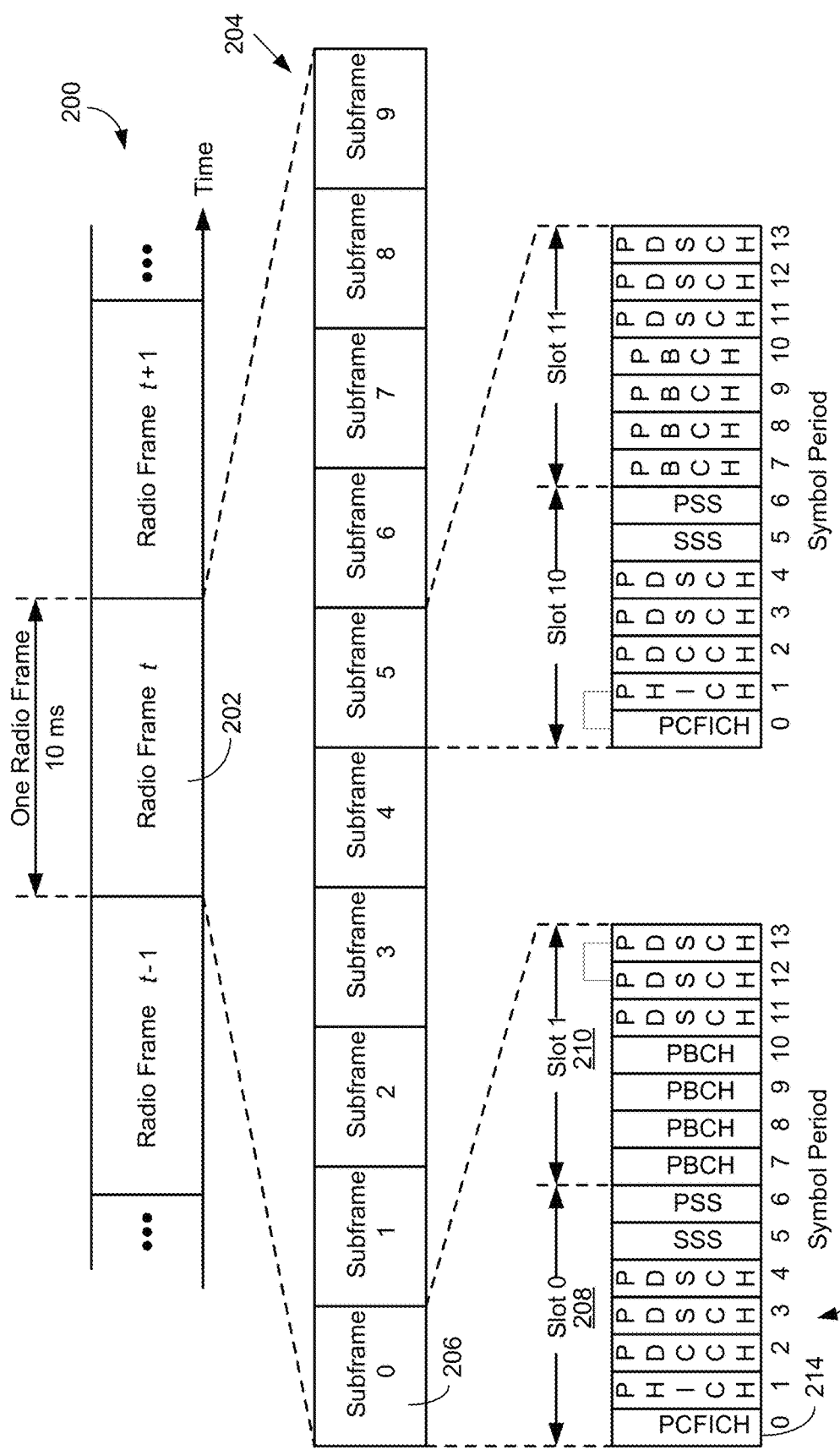
FIG. 2 is a block diagram illustrating an example of a downlink frame structure in a telecommunications system.
Figure 6:
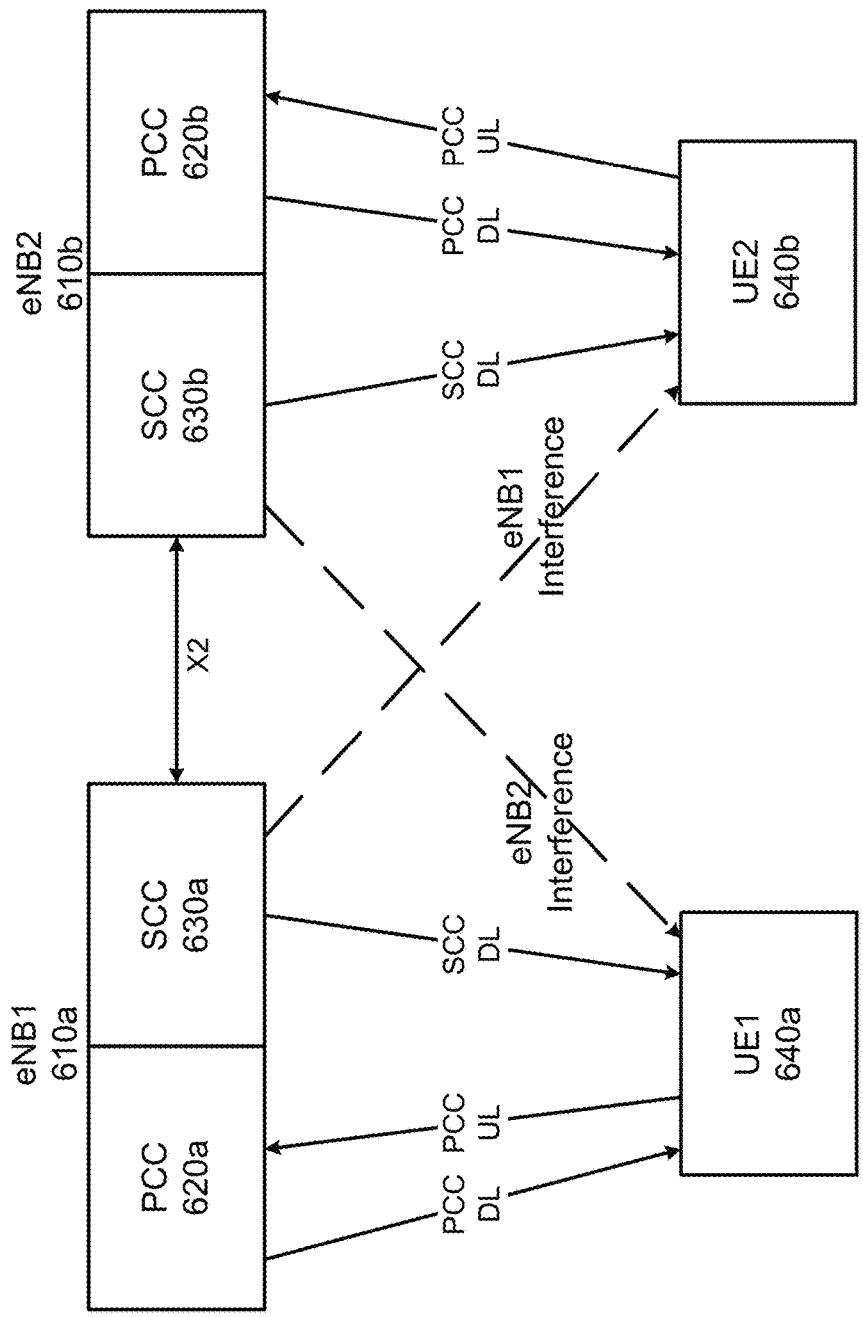
FIG. 6 illustrates an example of a LAA system.

FIG. 2 shows a downlink frame structure used in LTE. The transmission timeline for the downlink may be partitioned into units of radio frames 200. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include 'L' symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L-1. The available time frequency resources may be partitioned into resource blocks. Each resource block may cover 'N' subcarriers (e.g., 12 subcarriers) in one slot.

In LTE, an eNB 110 may send a primary synchronization signal (PSS) and a secondary synchronization signal (SSS) for each cell in the eNB 110. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB 110 may send a Physical Broadcast Channel (PBCH) in symbol periods 0 to 3 in slot 1 of subframe 0. The PBCH may carry certain system information.

The eNB 110 may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB 110 may send a Physical H-ARQ Indicator Channel (PHICH) and a Physical Downlink Control Channel (PDCCH) in the first M symbol periods of each subframe (M=3 in FIG. 2). The PHICH may carry information to support hybrid automatic retransmission (H-ARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB 110 may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB 110 may send the PSS, SSS and PBCH in the center 1.08 MHz of the system bandwidth used by the eNB 110. The eNB 110 may send the PCFICH and PHICH across the entire system bandwidth in each symbol period in which these channels are sent. The eNB 110 may send the PDCCH to groups of UEs in certain portions of the system bandwidth. The eNB 110 may send the PDSCH to specific UEs in specific portions of the system bandwidth. The eNB 110 may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB 110 may send the PDCCH to the UE in any of the combinations that the UE will search.

Figure 3:
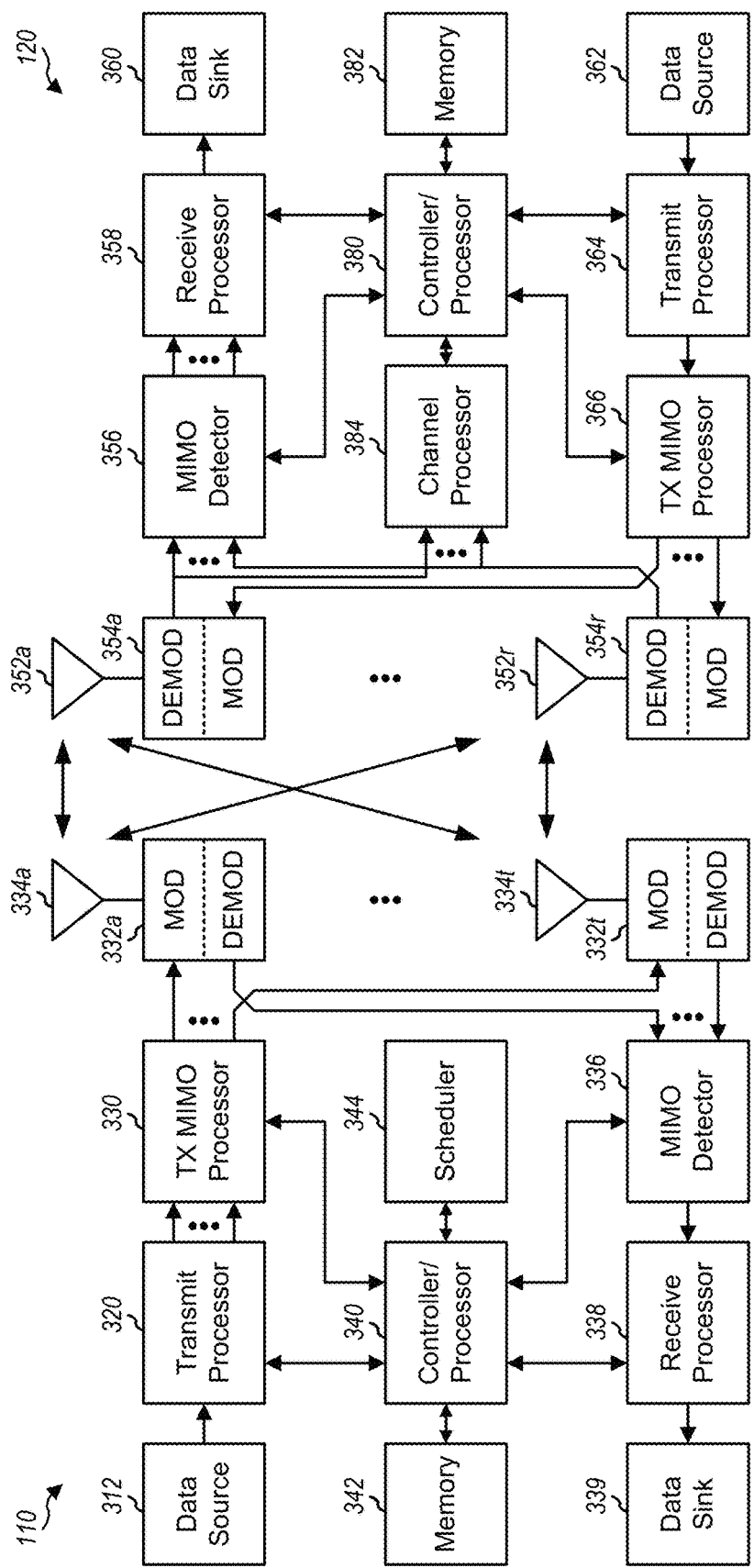
FIG. 3 is a block diagram illustrating a design of a base station/eNB and a UE configured according to one aspect of the present disclosure.

FIG. 3 shows a block diagram of a design of a base station/eNB 110 and a UE 120, which may be one of the base stations/eNBs 110 and one of the UEs 120 in FIG. 1. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive downlink signals from the base station 110 and/or neighboring base stations and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive (RX) processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

If the UE transmits data on the PUSCH without a simultaneous transmission on the PUCCH for a serving cell c, then the UE transmit power $P_{PUSCH,c}^{(i)}$ for PUSCH transmission in subframe i for the serving cell c may be given by:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBM]

For example, $Po\_{PUSCH,c}$ may be a target received power. $\alpha_c$ may be a slope of the target received power.

Further details and formulas for power control in LTE may be provided in, for example, 3GPP TS 36.213 which is incorporated in its entirety herein.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in the figures below and/or other processes for the techniques described herein. The processor 340 and/or other processors and modules at the eNB 110 may perform or direct the execution of the functional blocks illustrated in the figures below and/or other processes for the techniques described herein. The memories 342 and 382 may store data and program codes for the base station 110 and the UE 120, respectively. A scheduler 344 may schedule UEs for data transmission on the downlink and/or uplink.

As will be readily appreciated, antennas 334, modulators 332, transmit processor 320, and/or TX MIMO processor 330 may form a transmit chain of eNB 110 and supply means for sending or transmitting downlink signals under the control of processor 340. For example, the transmit chain may supply means for performing clear channel assessment (CCA) in a Licensed Assisted Access (LAA) network (i.e. LTE-U).

As will be readily appreciated, antennas 334, demodulators 332, receive processor 338, and/or RX MIMO detector 336 may form a receive chain of eNB 110 and supply means for performing CCA in LAA.

In one aspect, processor 340 includes modules for performing operations of the methods described herein, by executing instructions held in the memory 342. Such modules, for example, may include means for controlling downlink data rate in a licensed assisted access (LAA) network, means for performing time division multiplexing (TDM) in a LAA network, or means for allocating subframes in a LAA network. Such modules, for example, may be utilized by processor 340 to control operation of the respective transmit and receive chains.

The controllers/processors 340 and 380 may direct the operation at the eNB 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 20-30, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the base station 110 may include means for performing the process illustrated in the figures below. In one aspect, the aforementioned means may be the processor(s), the controller/processor 340, the memory 342, the receive processor 338, the MIMO detector 336, the demodulators 332*a*, and the antennas 334*a* configured to perform the functions recited by the aforementioned means. In another aspect, the aforementioned means may be a module or any apparatus configured to perform the functions recited by the aforementioned means.

FIG. 4A shows an example of contiguous carrier aggregation. To achieve high data rates for LTE, it may be necessary to increase the transmission bandwidth(s) that are supported by using a single carrier or channel. By using carrier aggregation (CA), it is possible to use more than one carrier and increase the overall transmission bandwidth. In an embodiment, K number of component carriers (CCs) may be available and may be adjacent to each other, where in general K may be any integer value. K may be limited to 5 or less in some LTE releases. As shown in FIG. 4A, component carriers 402*a*, 404*a*, and 406*a* are adjacent to each other. Each of the component carriers 402*a*, 404*a*, and 406*a* may have a bandwidth of up to 20 MHz. The overall system bandwidth may be up to 100 MHz when five CCs are supported. FIG. 4B shows an example of non-contiguous carrier aggregation. K number of CCs may be available and may be separate from each other. As shown in FIG. 4B, component carriers 402*b*, 404*b*, and 406*b* are not adjacent or are non-contiguous to each other. Each CC may have a bandwidth of up to 20 MHz. The aggregated carriers may include a primary component carrier (PCC), serving the primary serving cell (PSC or PCell). The primary serving cell may be referred to as the PCell. The aggregated carriers may include a number of secondary component carriers (SCC), each serving a respective secondary serving cell (SSC or SCell).

In accordance with one or more aspects of the disclosure, there are provided methods and apparatuses for eNB devices to perform unlicensed frequency reuse and time division multiplexing in a Licensed Assisted Access (LAA) network. In at least one embodiment, LTE operation in an unlicensed band may offer significantly better coverage and higher spectral efficiency in comparison to WiFi, while also enabling a seamless flow of data across licensed and unlicensed bands in a core network. In an example, from the perspective of a user, LAA may provide an enhanced broadband experience, higher data rates, seamless use of both licensed and unlicensed bands, with high reliability and robust mobility through a licensed anchor carrier. However, a consideration for LAA is to ensure that LAA co-exists with current access technologies such as WiFi on "fair" and "friendly" bases.

LTE may provide several operational modes. For operation in the unlicensed spectrum, LTE may be referred to as LAA ("Licensed Assisted Access) or LTE-U ("LTE in Unlicensed band"), as discussed before. Such unlicensed spectrum may include unlicensed or "license-exempt" radio bands for 802.11 (WiFi), 802.15.1 (Bluetooth) and 802.15.4 (ZigBee) that are used in a 2.4 GHz ISM (Industrial, Scientific and Medical) band and a 5 GHz U-NII (Unlicensed National Information Infrastructure) band. LAA may enable data offload initially in an unlicensed band(s) by leveraging LTE carrier aggregation and Supplemental Downlink (SDL) protocols. For example, LAA may provide a supplemental downlink (SDL) mode for use by existing licensed spectrum service providers (traditional MNO). The SDL may be used for downlink capacity offload. In another mode, carrier aggregation (CA) may be used by existing licensed spectrum service providers (traditional MNO). The CA mode may be used for downlink and uplink capacity offload. In another mode called standalone (SA) mode, no licensed spectrum may be used by a service provider. The SA mode may be used by venue (e.g., a sports stadium) operators or mobile virtual network operators (MVNOs). SA mode may be used for in-venue access or for non-traditional wireless access, or in an enterprise setting.

Carrier aggregation (CA) mode may include a design based on CA using either or both the licensed spectrum and the unlicensed spectrum. In one design, the licensed spectrum may be used as an anchor or primary component carrier (PCC). Control and critical data may be transported on the licensed spectrum. The unlicensed spectrum may be used for data offload providing data-only transmissions. In the downlink and uplink, LTE on the licensed channel may provide both control and data. LTE on the unlicensed channel may provide data.

For operation in the unlicensed spectrum, devices may be configured for listen-before-talk (LBT). LBT is the mechanism utilized by an eNB to perform clear channel assessment (CCA) before using a channel in the unlicensed spectrum. In one embodiment, the downlink transmitter at the eNB may perform CCA every 10 milliseconds (ms). However, it is appreciated that other time periods for performing CCA may be used and still be within the scope of the subject technology. In one aspect, LBT can be in a fixed frame period where multiple eNBs are synchronized. In such a case, the S' subframe that includes the downlink channel usage beacon signal (D-CUBS) will occur at the same time for multiple eNBs. Alternatively, LBT can be a floating frame period in which the S' subframe that includes D-CUBS may or may not be the same across different eNBs.

The CCA may provide a mechanism for the transmitter to grab-and-relinquish the channel resources. The eNB can observe the channel in the unlicensed spectrum for the duration of the CCA observation time. The channel is considered occupied and unavailable if the observed energy level exceeds a predetermined threshold. In the event that CCA fails because the channel is occupied, the eNB can perform an extended CCA (eCCA) check. During eCCA, the channel can be observed for a random duration of time. For example, the eNB can generate a random number 'N' which can be a value between 1 and 'q'. In some embodiments, 'q' is an eNB parameter that dictates the channel occupancy time. For example, 'q' may be a value from 4 to 32. The random number 'N' can dictate the number of times the channel is monitored in order to complete eCCA. After each iteration, a counter that is initialized with 'N' can be decremented. When the counter reaches zero, the eCCA is complete and the eNB can transmit.

In a fixed LBT frame configuration, two or more eNBs can claim a particular unlicensed channel at the same time at the conclusion of their respective CCA periods. That is, the eNBs are said to be in a frequency reuse configuration because they are each transmitting on the same channel at the same time. Similarly, if two or more eNBs are in a fixed LBT frame configuration and they each perform eCCA utilizing the same random number 'N,' the eNBs will transmit at the same time and again be in a frequency reuse configuration. Alternatively, if the two or more eNBs perform eCCA utilizing different random numbers, the eNB with the smaller random number will complete eCCA first and claim the channel before the others. In this situation, the eNBs are said to be in a time-division multiplexing (TDM) configuration. In a floating LBT frame configuration, the frame alignment is random and therefore the two or more eNBs can end up in either a frequency reuse configuration or in a TDM configuration.

Figure 5:
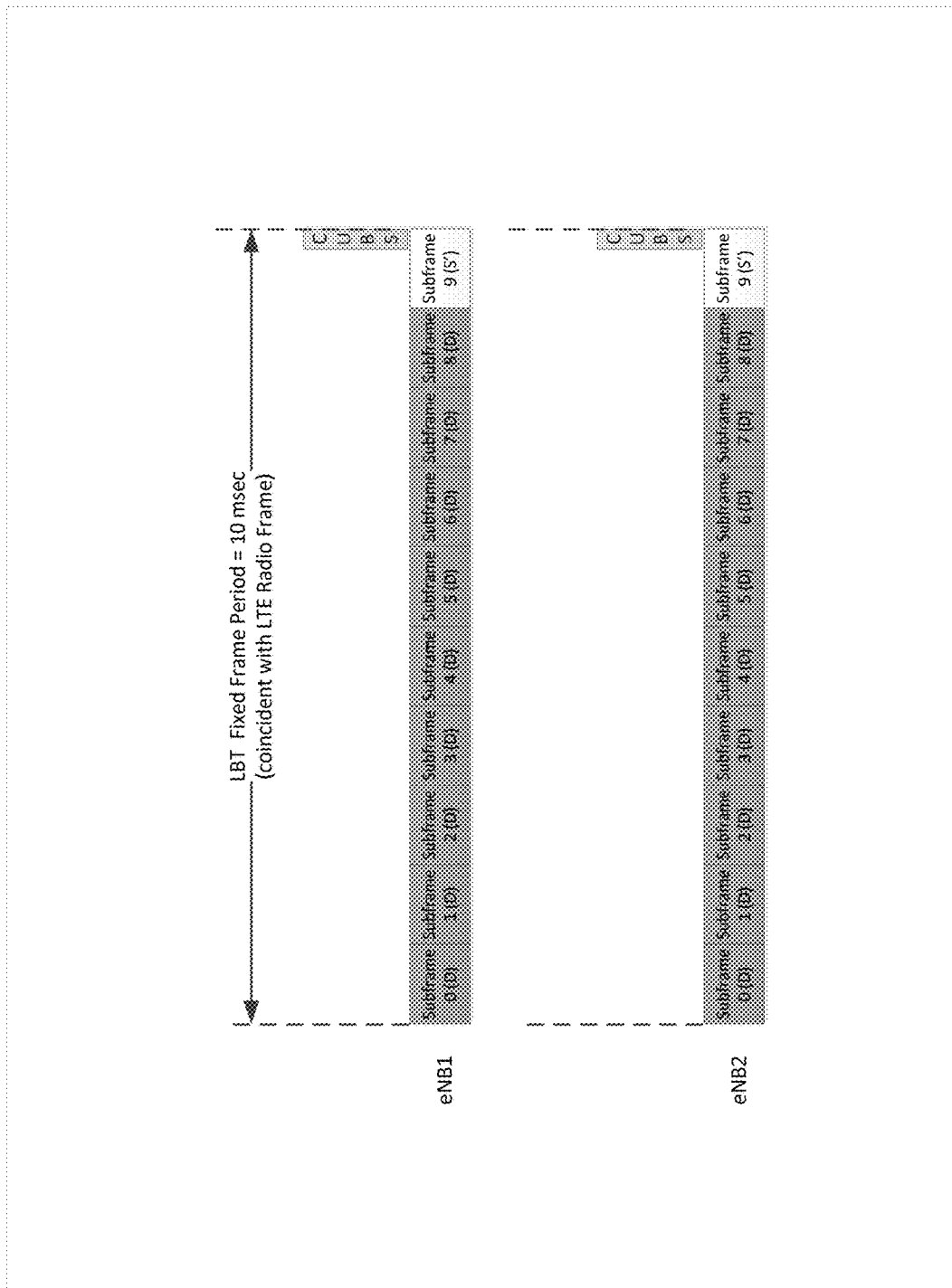
FIG. 5 illustrates example listen before talk (LBT) frames.

FIG. 5 illustrates an example LBT in a downlink (DL) frame structure from two eNBs. The LBT frames may coincide with the 10 ms radio frames. One LBT frame may include 9 downlink (DL) subframes followed by one S' subframe. The DL subframes may be used for data transmission. The S' subframe may be used for CCA, eCCA, or channel usage beacon signals (CUBS).

CCA may succeed if a receive power, detected at a node, during CCA stays below a specified threshold. If CCA succeeds at a node then the node may "grab-and-hold" the medium, until the start of the next S' subframe. That is, the node may utilize the unlicensed spectrum to transmit data for a particular time duration, such as the length of a frame. The node may transmit CUBS for the remaining symbols of the S' subframe. In some aspects, CUBS can ensure that other nodes performing CCA later in the S' subframe sense that the medium is occupied. In this regard, the transmission of CUBS may effectively block the transmission signals of other UEs that are nearby. The node may then transmit data from the next (e.g., 0th) subframe onwards until needed (for up to 9 subframes).

In both downlink frames from eNB1 and eNB2, the S' subframe is allocated as subframe 9. Because the eNBs are in a fixed LBT configuration, both eNB1 and eNB2 perform CCA concurrently and can each transmit CUBS at the same time. Therefore both eNB1 and eNB2 can take simultaneous control of the unlicensed channel to transmit data to one or more UEs. As indicated above, this configuration is referred to as a "frequency reuse configuration." The frequency reuse configuration can operate correctly when UEs are within range of a single eNB. However, if a UE is within range of multiple eNBs (e.g., eNB1 and eNB2), the frequency reuse configuration can result in degraded performance because the downlink signal from eNB2 can interfere with the downlink signal from eNB1, and vice-versa.

FIG. 6 illustrates an example system 600 implementing licensed assisted access (LAA). System 600 includes eNB1 610a and eNB2 610b. Each eNB 610a and 610b can be configured to perform carrier aggregation utilizing a primary component carrier (PCC) and a secondary component carrier (SCC). For example, eNB1 610a can include PCC 620a and SCC 630a. Similarly, eNB2 610b can include PCC 620b and SCC 630b. In an LAA system, the PCC can be licensed LTE spectrum and it can include bi-directional communication with the UE via one or more downlink and uplink channels. The SCC can be unlicensed spectrum that is utilized by the eNB to increase bandwidth. The eNB can transmit using the unlicensed channels after it successfully performs CCA and/or eCCA, as discussed above.

In system 600, UE1 640a is served by eNB1 610a, for example, because the signal strength from eNB1 610a is stronger. Similarly, UE2 640b is served by eNB2 610b because, relative to UE2 640b, the signal strength from eNB2 610b is stronger. In some instances, eNB1 610a and eNB2 610b can simultaneously perform LBT and begin transmitting at the same time and on the same frequency (via their respective SCCs) to each of their corresponding UEs. In such approaches, the two eNBs are said to be in a "frequency reuse configuration." Consequently, if UE1 640a is an edge UE that is within the energy range of eNB2 610b, it may receive interference on the SCC (represented by a dashed line) from eNB2 610b. Similarly, if UE2 640b is an edge UE within the energy range of eNB1 610a, it may receive interference from eNB1 610a on its corresponding SCC.

In a frequency reuse configuration, UE1 640a and UE2 640b can receive SCC signals from eNB1 610a and eNB2 610b that have similar signal strength. This interference may cause the UE's cyclic redundancy check (CRC) failure rate to increase, resulting in an increase in uplink negative acknowledgments (NACKs) transmitted to the serving eNB. In some implementations, each UE reports a channel quality indicator (CQI) to its serving eNB that is below acceptable levels. As a result, the serving eNB may respond by decreasing the downlink data rate on the SCC. The decrease in the downlink data rate by the eNB may be premature because the LBT collision may be infrequent and may not necessarily occur in a subsequent frame.

In one embodiment, an eNB such as eNB1 610a or eNB2 610b can intelligently control the downlink data rate in a LAA system or network by monitoring the received CQI measurements in order to detect a CQI degradation event. The eNB can maintain the downlink data rate if the CQI degradation event fails to meet a predetermined degradation criterion. For example, the CQI degradation event may include receiving one or more CQI measurements from a UE that are below a pre-defined threshold. In some embodiments, the pre-defined threshold can include a network parameter, for example, that is configured by a network operator or administrator. Alternatively, the pre-defined threshold may be an automatically derived value based on previous CQI reports. That is, the eNB can maintain a filtered average of previous CQI measurements received from each of its one or more UEs. That is, a separate filtered average can be maintained for each individual UE. In some implementations, the average can be calculated based over a particular time frame and stored as a static value. Alternatively, the average may be continuously calculated/updated based on current network conditions. If the eNB receives a CQI measurement below the minimum CQI degradation threshold (i.e. degradation event) then it can determine if the downlink data rate should be adjusted based on the degradation criteria. In one example, the degradation criteria can include a maximum time period. That is, if the CQI measurement consists of a sudden dip that promptly recovers before the expiration of the maximum time period, the eNB can determine that it does not meet the degradation criteria and it can maintain the downlink data rate. Alternatively, if the CQI reports are consistently below the pre-defined threshold for a time exceeding the maximum time period, the eNB can determine that the downlink data rate to the UE should be decreased. In some aspects, the UE may provide, to the eNB, an indication that the UE is undergoing interference, and the eNB may maintain the downlink data rate, despite detecting the CQI degradation event, based on receiving this indication from the UE.

In another aspect, the CQI degradation event can include a downward trend in an average CQI value. For example, the eNB can calculate a filtered average of the CQI value over a time window that includes one or more LBT frames. In this instance, the degradation criteria may include the average CQI falling beneath a minimum CQI threshold. As new CQI measurements are received, they are included in the running average and the average is compared to the threshold. If the running average falls beneath the threshold, the eNB can determine that the degradation criterion has been met and respond by reducing the downlink data rate. Alternatively, the eNB may select a different channel (i.e. a different frequency) to avoid a frequency reuse configuration with its neighboring eNB and the LBT frame collision is rendered moot.

In some instances, an eNB that is part of a frequency reuse configuration may also receive one or more NACKs from the UE. The NACKs can affect the block error rate (BLER) which can decrease the downlink data rate. In a further aspect of the present technology, the eNB may determine that one or more NACKs are associated with a subsequent CQI measurement. The eNB may further determine that the one or more NACKs can be discounted and calculate the BLER without the NACKs in order to maintain the downlink data rate. The NACKs can be received in one or more LBT frames or in one or more subsequent frames transmitting data to the UE. Alternatively or in addition to these techniques, the eNB may also employ a floating target BLER in order to maintain the downlink data rate. For example, the eNB can detect a LBT frame collision and increase its outer loop target BLER from a default value to a higher setting. In some embodiments, the default/target BLER rate can be set to 10% transmit block CRC fail rate and the increased BLER rate can be set to 30% transmit block CRC fail rate. When the eNB determines that the LBT collision no longer exists, it can return the BLER rate to the default, e.g., 10%. These values are provided as examples and are not meant to limit the present technology.

Returning to FIG. 6, eNB1 610a and eNB2 610b may also communicate with each other over an X2 interface. In some embodiments, eNB1 610a may transmit a listen before talk (LBT) frame schedule to eNB2 610b. Upon receipt of the LBT frame schedule, eNB2 610b can determine whether or not it conflicts with a local LBT frame schedule. If so, eNB2 610b can determine that it is in a frequency reuse configuration and it can utilize the techniques described herein to control the downlink data rate. Alternatively, eNB2 610b can modify its own LBT frame schedule to avoid the conflict and implement time division multiplexing (TDM) for the channel with eNB 1 610a. As described above, if the LBT frames from two or more eNBs are not synchronized, the eNBs are in a TDM configuration and the downlink signals do not interfere with each other.

In one embodiment, a TDM configuration can be implemented by generating, at an eNB, a random number for performing CCA. The random number can be used to determine a time to perform CCA that does not conflict with a neighboring eNB (e.g., a time that reduces or prevents conflicts with one or more neighboring eNBs). In some aspects, an eNB may determine the random number in coordination with one or more other random numbers determined by one or more other eNBs. For example, eNB1 and eNB2 can both utilize the same seed and the same random number generator such that they each yield the same result.

After the random number is generated, eNB1 can modify the random number using an offset value. For example, eNB1 can add an offset value to the random number, such that the resulting value is greater than the number generated by eNB2. In this example, eNB2 will complete CCA prior to eNB1 and will be able to claim the channel such that the two eNBs are in a TDM configuration. In a subsequent subframe, eNB1 can subtract an offset value (e.g., the same offset value or a different offset value) from the random number in order to yield a number that is less than the number generated by eNB2. In this case, eNB1 will complete CCA prior to eNB2 and will be able to claim the channel. Accordingly, the eNBs can ensure that they are in a TDM configuration and can share the channel equally over time. The eNBs can also utilize the X2 interface to perform handshaking for the purpose of the random number generation and determining which eNB will add or subtract the offset from the random number. Alternatively, the protocol for determining the random number can be pre-programmed or configured by a network operator.

In another embodiment, the seed for generating the random number for performing CCA can be selected from one or more number sets that are stored at the eNB. The number sets stored on the eNB can be guaranteed to be non-colliding. That is, each number set can be unique in that a number that is present in one set will not be present in another. The selection of the number set can be based on a unique identifier associated with the eNB. For example, the selection can be based on the cell ID, such that the same number set can be used for multiple eNBs and can result in different random numbers. Alternatively, each eNB can have stored multiple sets of numbers that are not unique but the selection of the number can based on an index. In this case, the random number can be selected from one of the sets by utilizing the index that results in a unique number selection. In some aspects, the eNBs may communicate with one another (e.g., directly or via a network device, such as an MME) to identify the random number and enable coordination of random number generation by multiple eNBs.

In some aspects, multiple eNBs (e.g., eNB1 and eNB2) may still conflict despite using the above-described technique for random number generation in association with performing CCA. In this case, an eNB may detect a CQI degradation event and may maintain a downlink data rate, despite detecting the CQI degradation event, when one or more criteria are satisfied, as described above in connection with FIG. 6. In some aspects, the eNB may receive, from a UE, an indication that the UE is undergoing interference, and may maintain the downlink data rate based on the indication that the UE is undergoing interference. In this way, the eNB may increase network throughput as compared to decreasing the downlink data rate for a conflict that results in a temporary interference condition.

Figure 7:
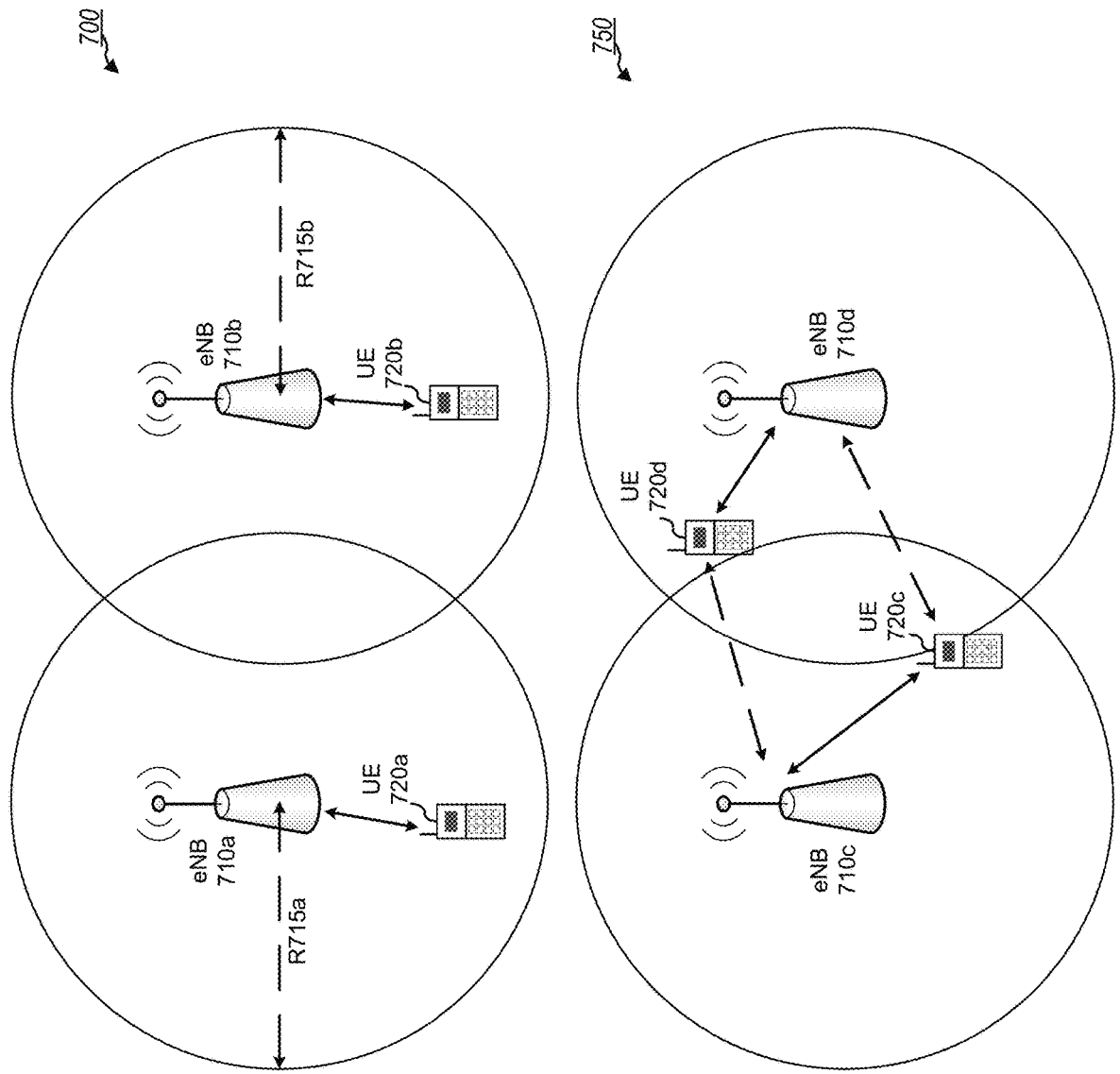
FIG. 7A and FIG. 7B illustrate a further example of a LAA system.

FIG. 7A illustrates a further example of a licensed assisted access (LAA) system 700. In system 700, eNB 710a is associated with UE 720a and eNB 710b is associated with UE 720b. Each of eNB 710a and eNB 710b has a coverage area depicted by a circle around the respective eNB. The coverage area can extend out a distance equivalent to the radius of the circle R715a and R715b for eNB 710a and eNB 710b respectively. In system 700, eNB 710a and eNB 710b are neighboring eNBs whose coverage area includes some overlap. That is, the energy detection range of each eNB covers some common geographical areas. The common coverage area is depicted by the overlap between the two circles around each eNB. Note that a circle is used for ease of representation and those skilled in the art will recognize that the coverage area for a particular eNB is not necessarily uniform and can be affected by a number of external factors.

In system 700, UE 720a and UE 720b are classified as center UEs. A center UE is a UE that is within the coverage area of a single eNB and is outside the range of interference of neighboring eNBs. For example, UE 720a is served by eNB 710a and it is physically located outside of the energy detection range of eNB 710b. Similarly, UE 720b is served by eNB 710b and it is outside the energy detection range of eNB 710a. In this example, eNB 710a and eNB 710b can implement LAA in a frequency reuse configuration and there would not be any degradation in downlink speed because the UEs are not interfered with by the neighboring eNB.

FIG. 7B illustrates an example of a LAA system 750 that includes edge UEs. In system 750, eNB 710c is associated with UE 720c and eNB 710d is associated with UE 720d. Similar to system 700, each eNB has a coverage area that is depicted by a circular region drawn around the respective eNB. In system 750, each of the UEs is located in a geographic area that is within the energy detection range of a neighboring UE. Accordingly, UE 720c and UE 720d are said to be edge UEs. For example, UE 720c can receive interference from neighboring eNB 710d that is depicted by a dashed line. Similarly, UE 720d can receive interference from neighboring eNB 710c that is also depicted by a dashed line. In an LAA system that includes edge UEs, a frequency reuse configuration can result in degraded performance due to lower downlink data rates.

Figure 8:
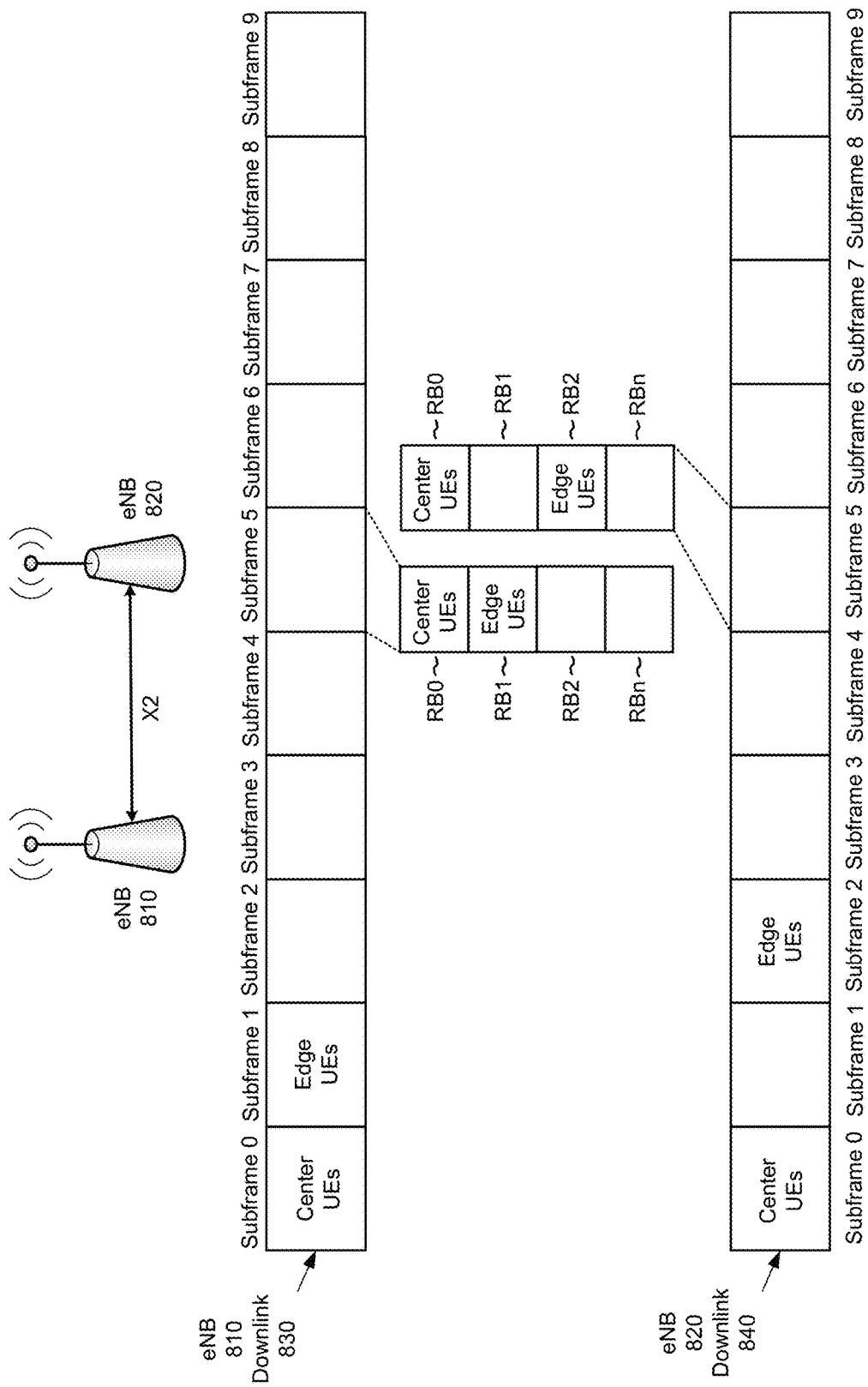
FIG. 8 illustrates an example of a concurrent downlink frames that include subframe and resource block allocation.

FIG. 8 illustrates an example of a concurrent downlink frames that correspond to two eNBs. The concurrent downlink frames can include subframe and/or resource block allocation for implementing time division multiplexing (TDM) in a licensed assisted access network. Downlink frame 830 corresponds to eNB 810 and includes ten subframes that can be allocated to transmitting data to different UEs associated with eNB 810. Similarly, downlink frame 840 corresponds to eNB 820 and includes ten subframes that can be allocated to transmitting data to different UEs associated with eNB820.

In one embodiment, eNB 820 can receive scheduling information for an upcoming subframe from eNB 810. The scheduling information can include information about edge UEs and center UEs that are associated with eNB 810. The scheduling information can also include subframe or resource block allocation for each of the UEs that is associated with eNB 810. Upon receipt of the scheduling information, eNB 820 can allocate a corresponding frame, subframe, or resource block such that it does not conflict with the schedule from eNB 810. For example, the scheduling information from eNB 810 can indicate that subframe 0 is allocated to the center UEs that are associated with eNB 810. Accordingly, eNB 820 can allocate its corresponding subframe 0 to its own center UEs. During subframe 0, the two eNBs will be in a frequency reuse configuration but it will not cause any service disruption because the only UEs receiving data are center UEs that are outside of the energy detection range of the neighboring eNB.

Alternatively, the scheduling information from eNB 810 can indicate that a particular subframe, such as subframe 1, is allocated to edge UEs. In response, eNB 820 can determine that its corresponding subframe 1 should not be utilized to transmit in order to avoid interfering with the downlink signal that eNB 810 is sending to its edge UEs. That is, the edge UEs associated with eNB 810 are within the energy detection range of eNB 820 and could experience degraded performance if eNB 820 transmits at the same frequency during subframe 1. In addition, eNB 820 can determine from the scheduling information that subframe 2 is available and it can schedule transmission to its own edge UEs during subframe 2. The scheduling information from eNB 820 can be sent to eNB 810 to make sure that both eNBs allocate resources without any conflicts.

In another embodiment, the scheduling information can be used to allocate resource blocks (RBs) within a particular subframe. For example, the scheduling information from eNB 810 may provide a breakdown of the RB allocation within a particular subframe, such as subframe 5. In this example, eNB 810 has scheduled transmission to center UEs in RB0 and to edge UEs in RB1 of subframe 5. Based on this scheduling information, eNB 820 can schedule its own center UEs for RB0 of corresponding subframe 5. In addition, eNB 820 can determine that RB 1 should not be used to transmit in order to avoid interfering with the edge UEs associated with eNB 810. The edge UEs associated with eNB 820 can be allocated in a different RB, such as RB2 of subframe 5. Accordingly, by sharing their corresponding network conditions (i.e. edge UEs, center UEs, etc.) the eNBs can intelligently allocate transmission resources such as frames, subframes, and resource blocks. This allocation allows the eNBs to configure frequency reuse for center UEs that are immune to interference and also to configure TDM for edge UEs that can be affected by interference in a frequency reuse configuration.

Figure 9:
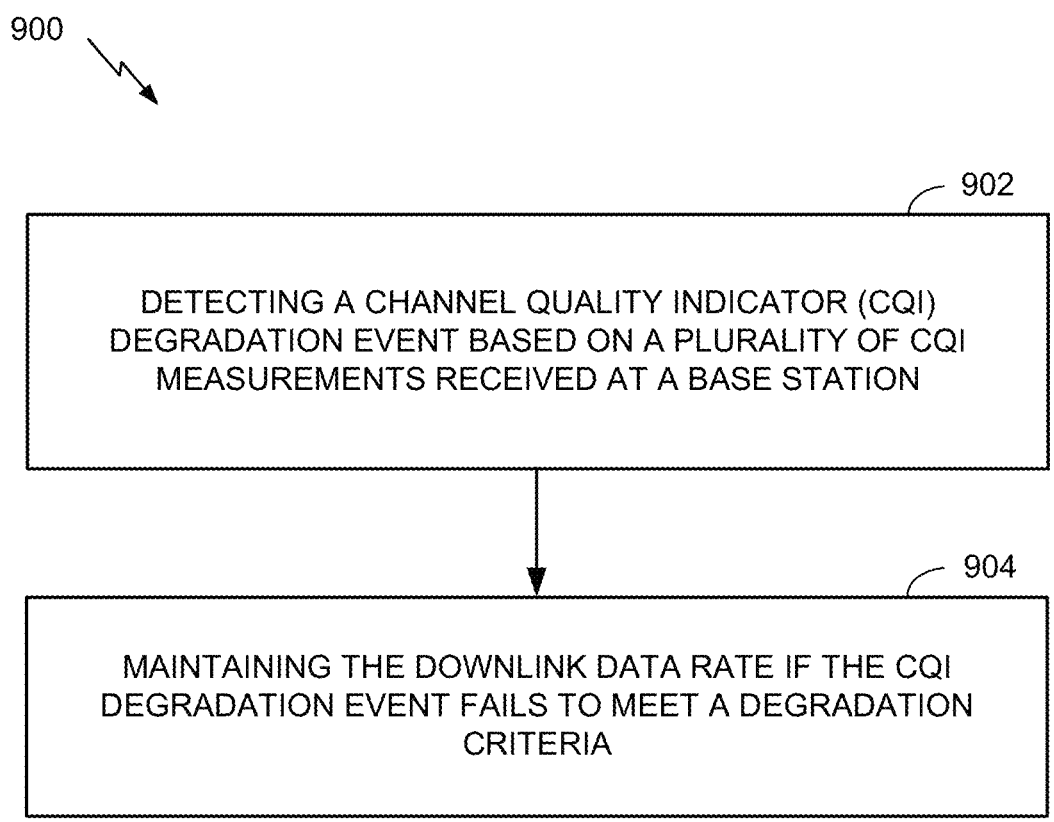
FIG. 9 illustrates an embodiment of methodologies for controlling downlink data rate in a LAA network.

FIG. 9 illustrates embodiments of methodologies for controlling downlink data rate in a LAA network. The method may be performed by a wireless entity such as an eNB, femto access point, or the like. The method 900 may include, at 902, detecting a channel quality indicator (CQI) degradation event based on a plurality of CQI measurements received at a base station. The method may include, at 904, maintaining the downlink data rate if the CQI degradation event fails to meet a degradation criteria.

Figure 10:
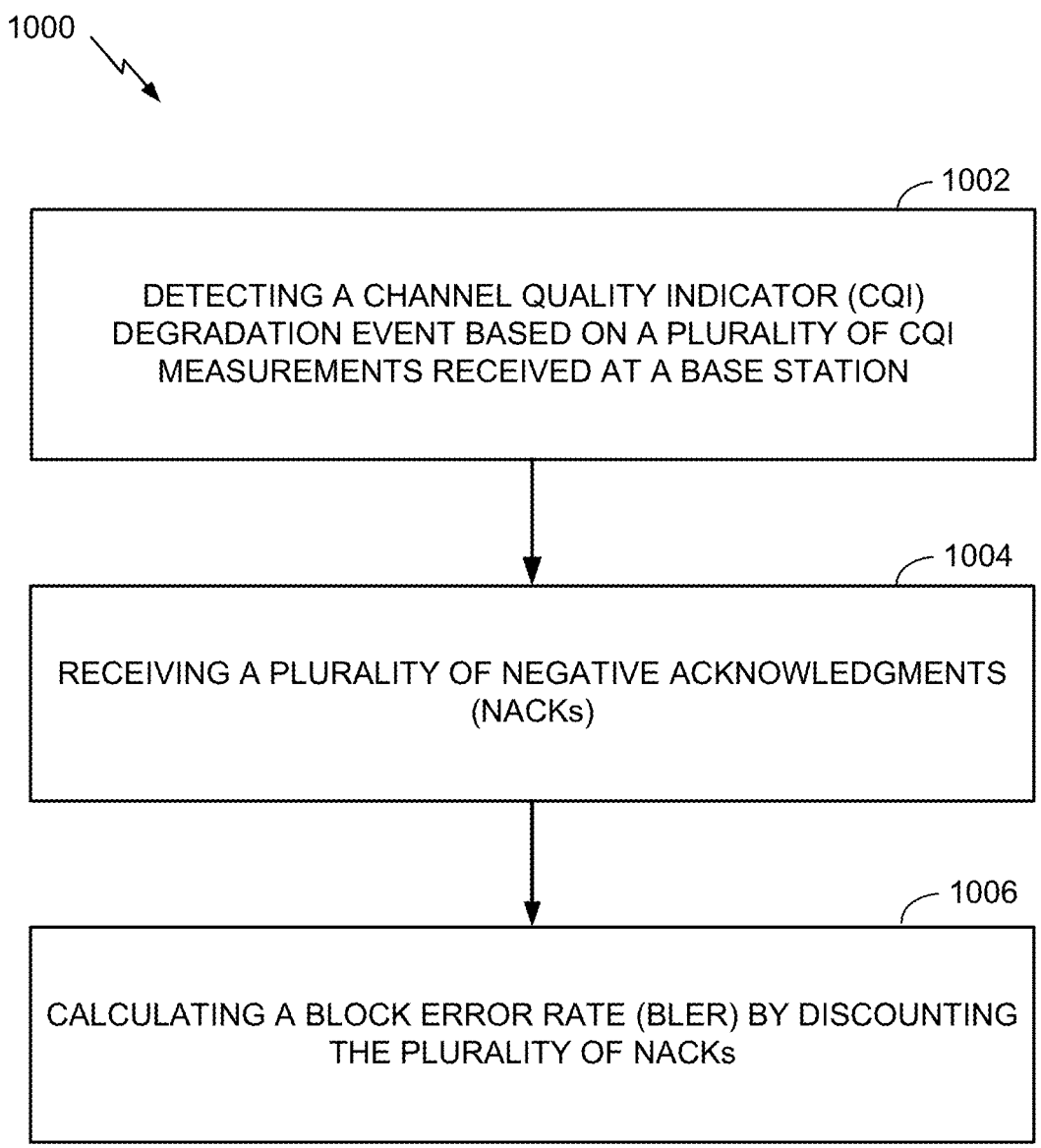
FIG. 10 illustrates another embodiment of methodologies for controlling downlink data rate in a LAA network.

FIG. 10 illustrates other embodiments of methodologies for controlling downlink data rate in a LAA network. The method may be performed by a wireless entity such as an eNB, femto access point, or the like. The method 1000 may include, at 1002, detecting a channel quality indicator (CQI) degradation event based on a plurality of CQI measurements received at a base station. The method may include, at 1004, receiving a plurality of negative acknowledgements (NACKs). The method may include, at 1006, calculating a block error rate (BLER) by discounting the plurality of NACKs.

Figure 11:
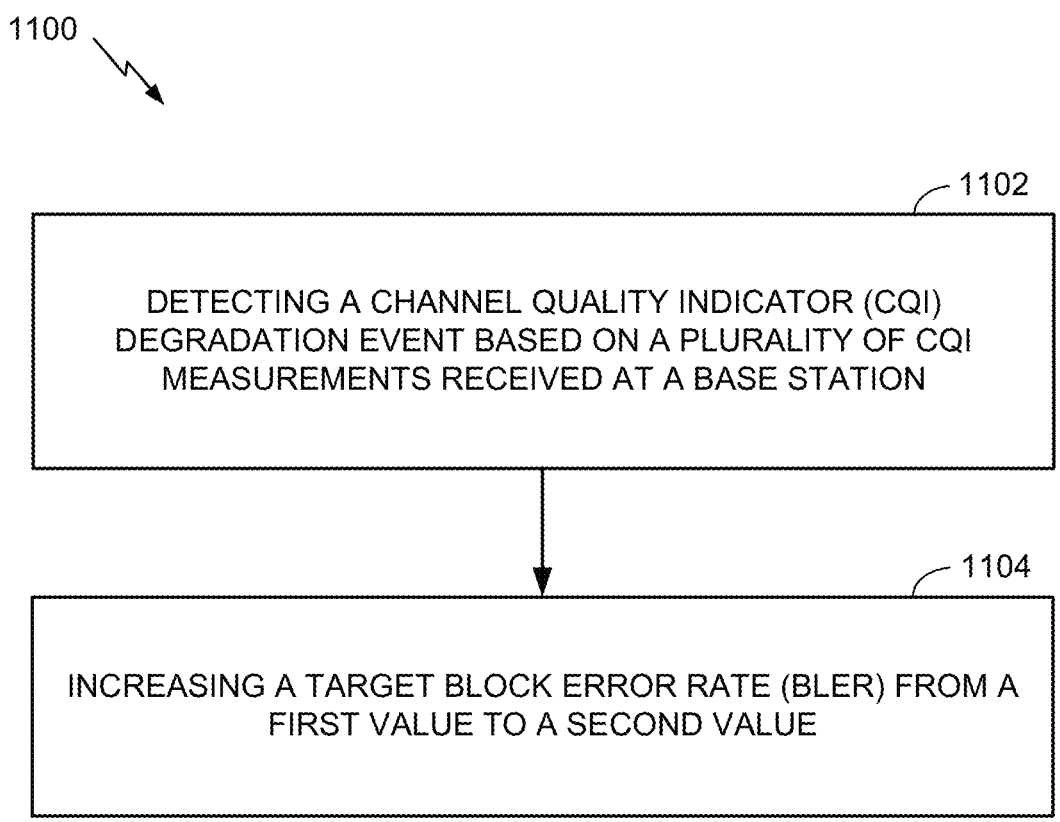
FIG. 11 illustrates another embodiment of methodologies for controlling downlink data rate in a LAA network.

FIG. 11 illustrates other embodiments of methodologies for controlling downlink data rate in a LAA network. The method may be performed by a wireless entity such as an eNB, femto access point, or the like. The method 1100 may include, at 1102, detecting a channel quality indicator (CQI) degradation event based on a plurality of CQI measurements received at a base station. The method may include, at 1104, increasing a target block error rate (BLER) from a first value to a second value.

Figure 12:
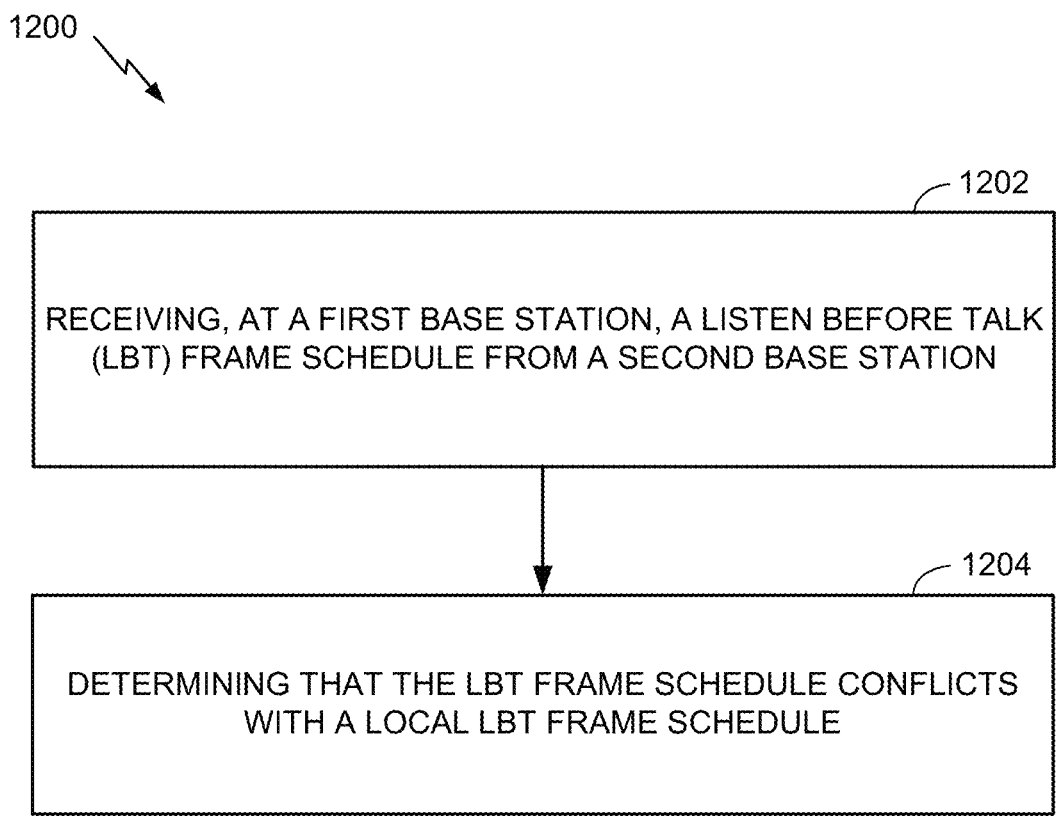
FIG. 12 illustrates another embodiment of methodologies for controlling downlink data rate in a LAA network.

FIG. 12 illustrates other embodiments of methodologies for controlling downlink data rate in a LAA network. The method may be performed by a wireless entity such as an eNB, femto access point, or the like. The method 1200 may include, at 1202, receiving, at a first base station, a listen before talk (LBT) frame schedule from a second base station. The method may include, at 1204, determining that the LBT frame schedule conflicts with a local LBT frame schedule.

Figure 13:
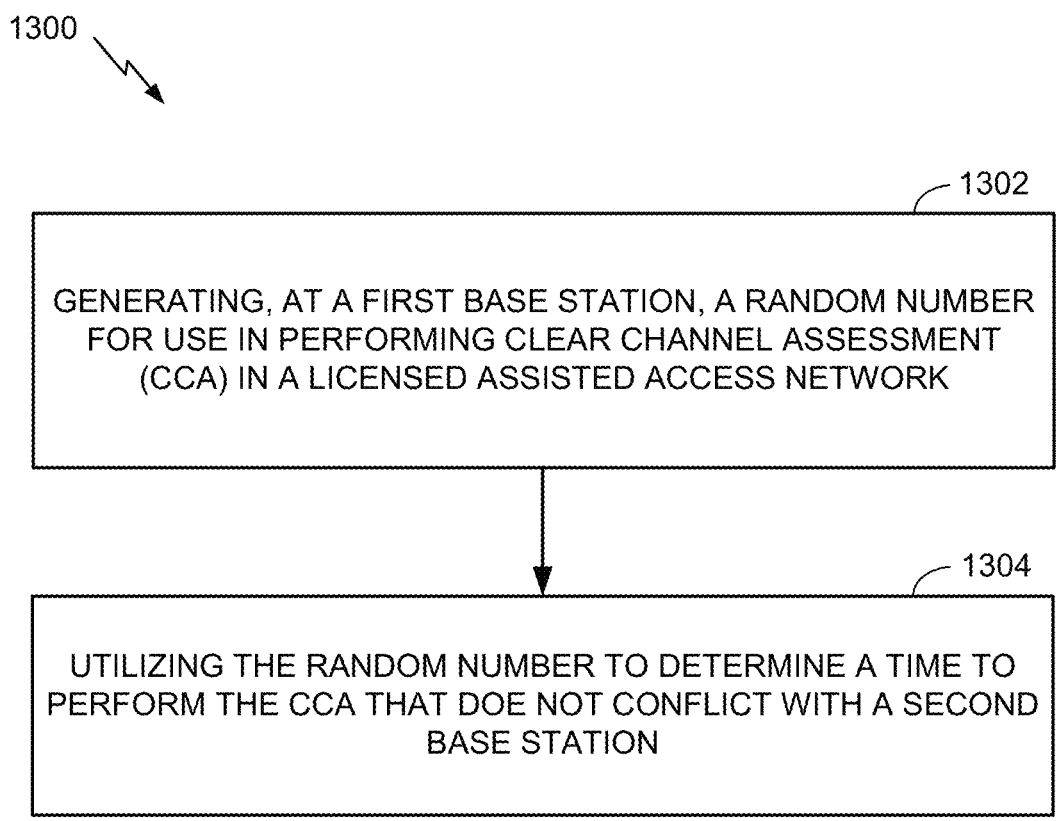
FIG. 13 illustrates an embodiment of methodologies for time division multiplexing (TDM) in a LAA network.

FIG. 13 illustrates embodiments of methodologies for time division multiplexing (TDM) in a licensed assisted access (LAA) network. The method may be performed by a wireless entity such as an eNB, femto access point, or the like. The method 1300 may include, at 1302, generating, at a first base station, a random number for use in performing clear channel assessment (CCA) in the LAA network. The method may include, at 1304, utilizing the random number to determine a time to perform the CCA that does not conflict with a second base station (e.g., to reduce or prevent conflicts with the second base station).

Figure 14:
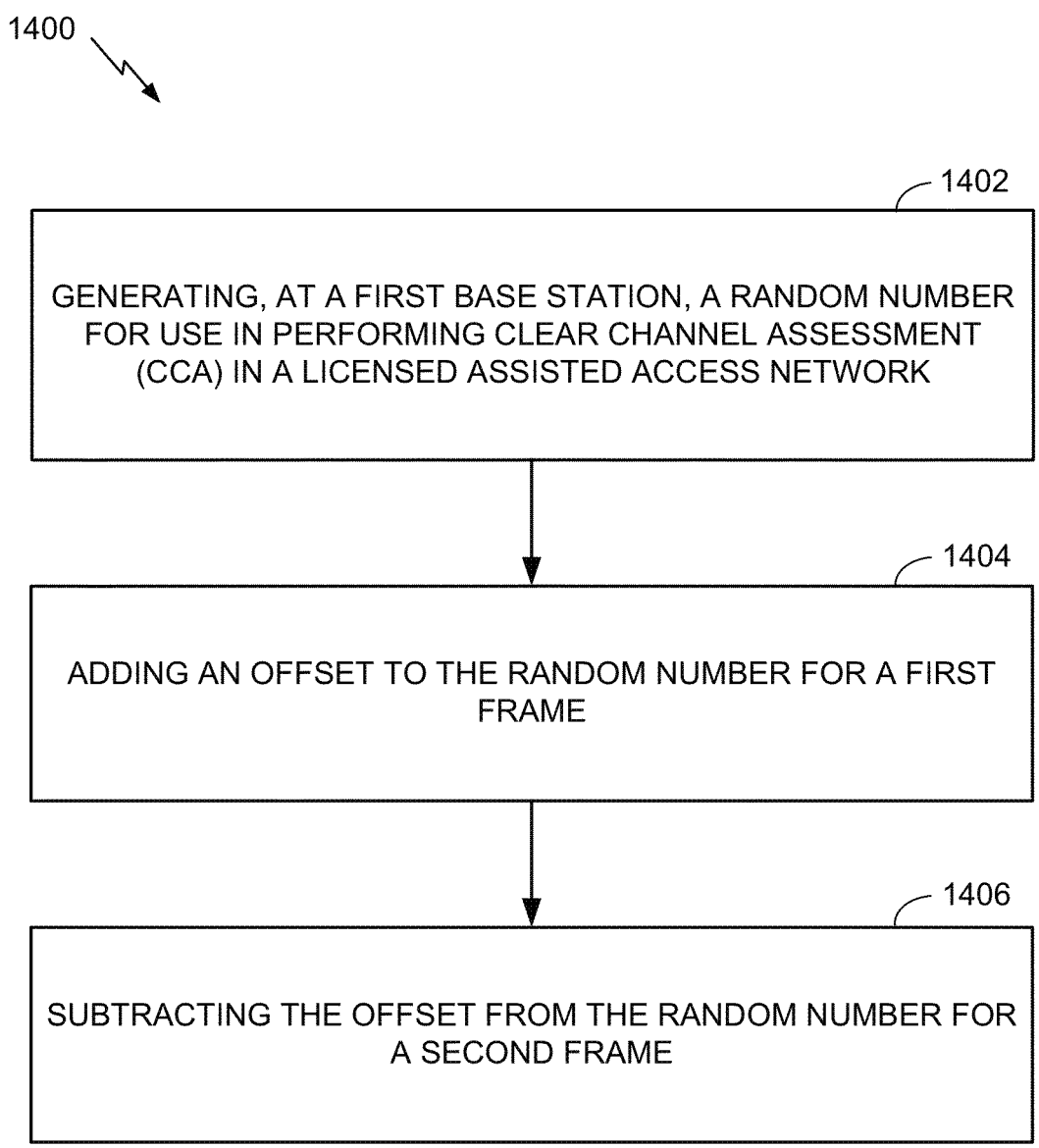
FIG. 14 illustrates another embodiment of methodologies for time division multiplexing (TDM) in a LAA network.

FIG. 14 illustrates other embodiments of methodologies for time division multiplexing (TDM) in a licensed assisted access (LAA) network. The method may be performed by a wireless entity such as an eNB, femto access point, or the like. The method 1400 may include, at 1402, generating, at a first base station, a random number for use in performing clear channel assessment (CCA) in the LAA network. The method may include, at 1404, adding an offset to the random number for a first frame. The method may include, at 1406, subtracting the offset from the random number for a second frame.

Figure 15:
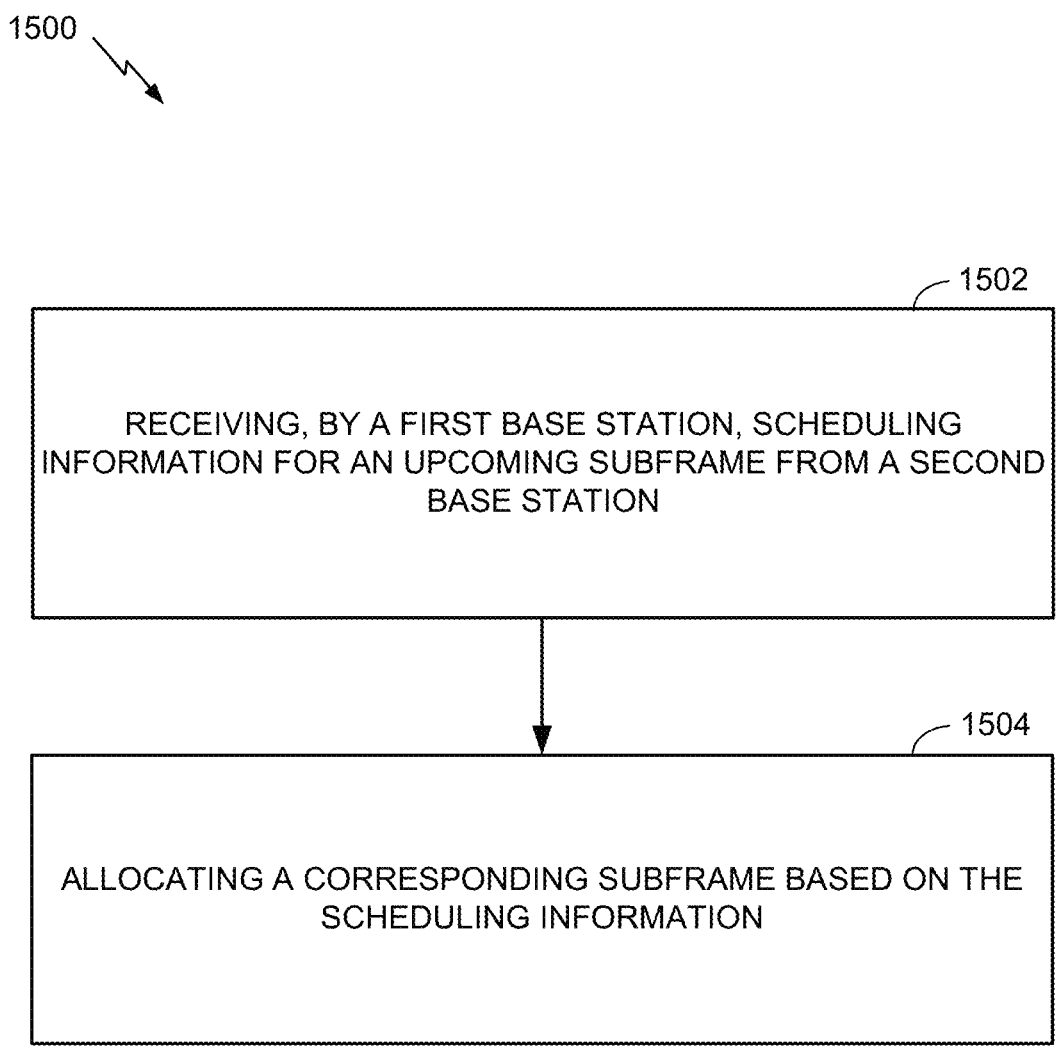
FIG. 15 illustrates an embodiment of methodologies for allocating sub-frames in a LAA network.

FIG. 15 illustrates embodiments of methodologies for allocating subframes in a licensed assisted access (LAA) network. The method may be performed by a wireless entity such as an eNB, femto access point, or the like. The method 1500 may include, at 1502, receiving, by a first base station, scheduling information for an upcoming subframe from a second base station. The method may include, at 1504, allocating a corresponding subframe based on the scheduling information.

Figure 16:
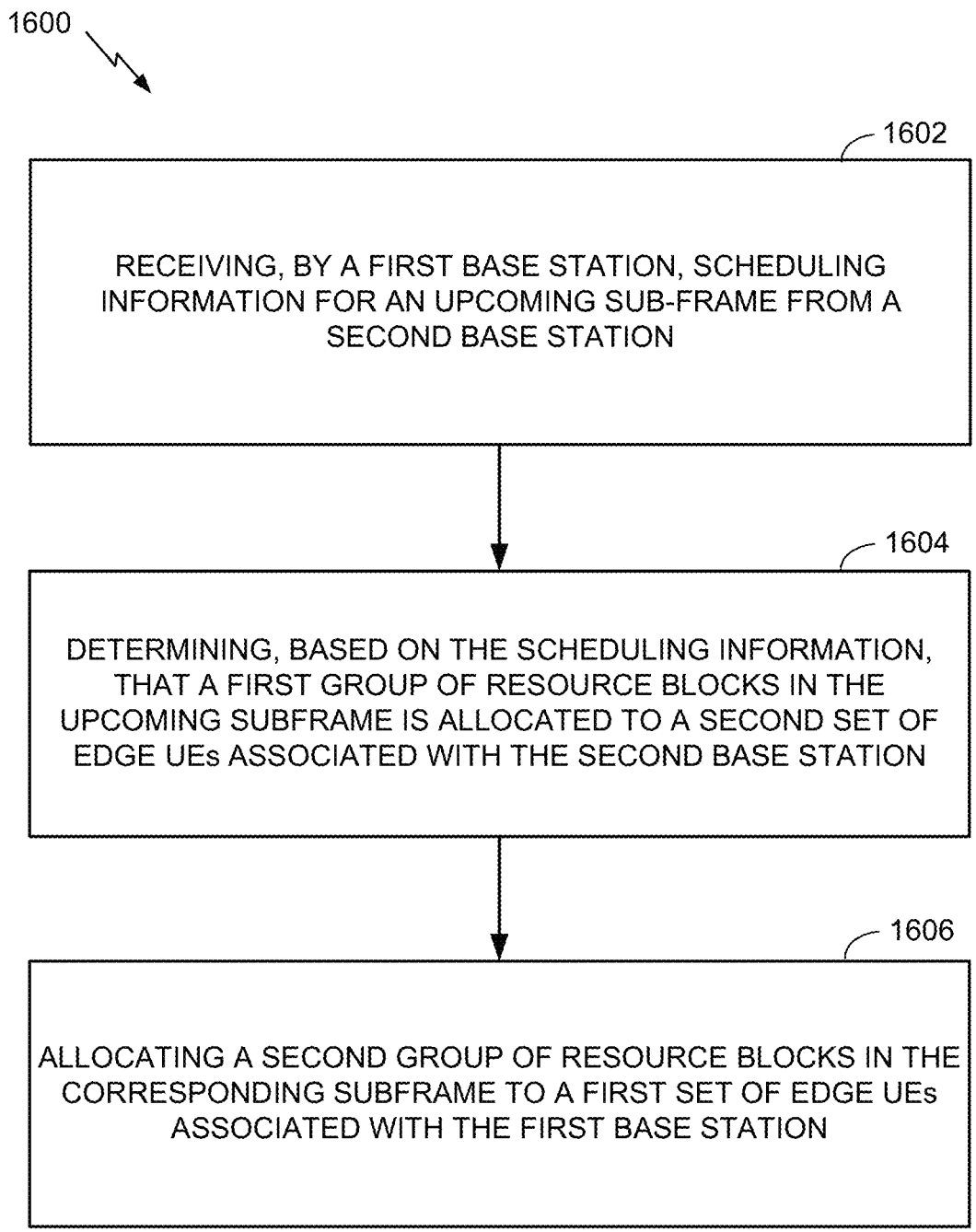
FIG. 16 illustrates another embodiment of methodologies for allocating sub-frames in a LAA network.

FIG. 16 illustrates other embodiments of methodologies for allocating subframes in a licensed assisted access (LAA) network. The method may be performed by a wireless entity such as an eNB, femto access point, or the like. The method 1600 may include, at 1602, receiving, by a first base station, scheduling information for an upcoming subframe from a second base station. The method may include, at 1604, determining, based on the scheduling information, that a first group of resource blocks in the upcoming subframe is allocated to a second set of edge UEs that are associated with the second base station. The method may include, at 1606, allocating a second group of resource blocks in the corresponding subframe to a first set of edge UEs that are associated with the first base station.

Figure 17:
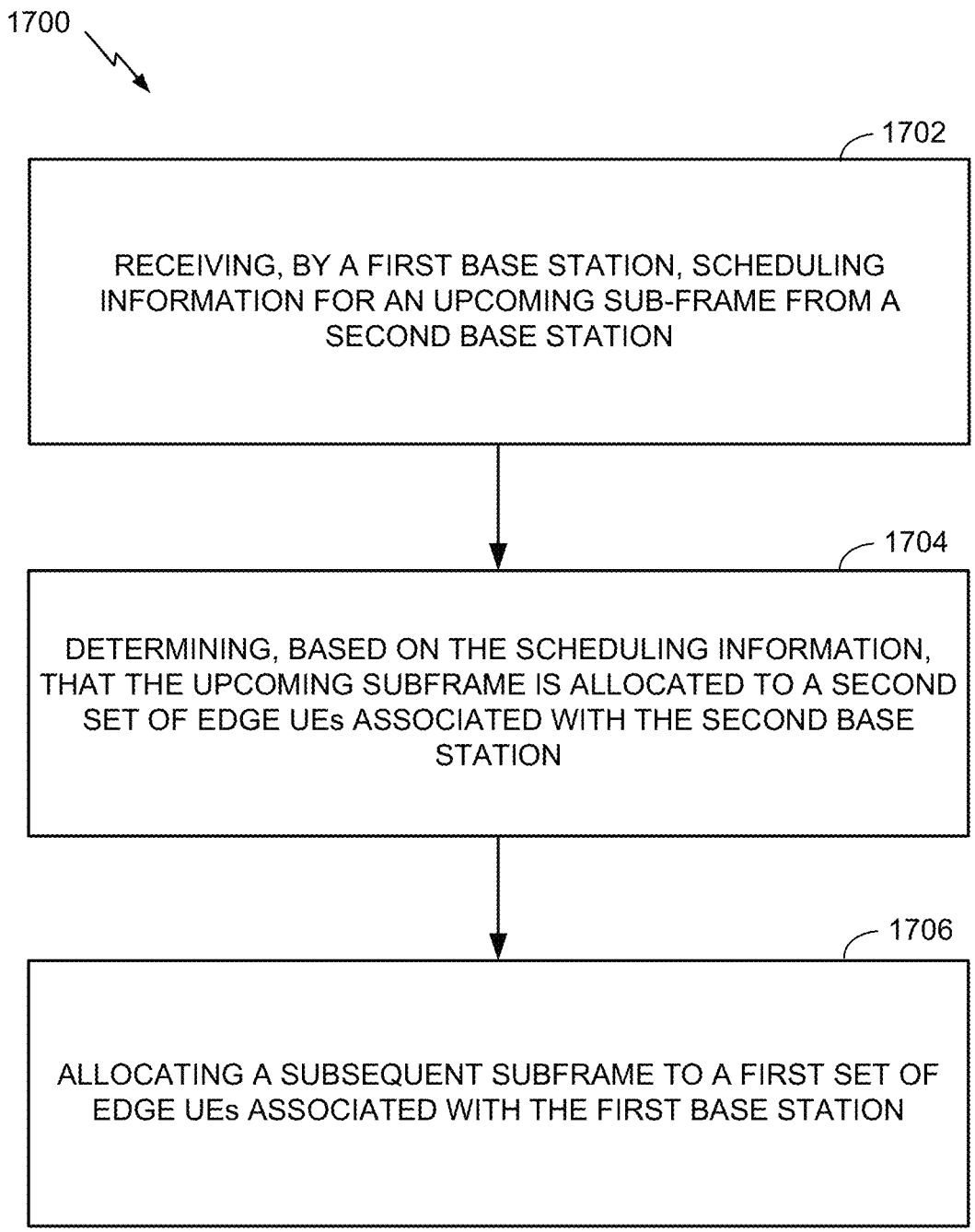
FIG. 17 illustrates another embodiment of methodologies for allocating sub-frames in a LAA network.

FIG. 17 illustrates other embodiments of methodologies for allocating subframes in a licensed assisted access (LAA) network. The method may be performed by a wireless entity such as an eNB, femto access point, or the like. The method 1700 may include, at 1702, receiving, by a first base station, scheduling information for an upcoming subframe from a second base station. The method may include, at 1704, determining, based on the scheduling information, that the upcoming subframe is allocated to a second set of edge UEs that are associated with the second base station. The method may include, at 1706, allocating a subsequent subframe to a first set of edge UEs that are associated with the first base station.

Figure 18:
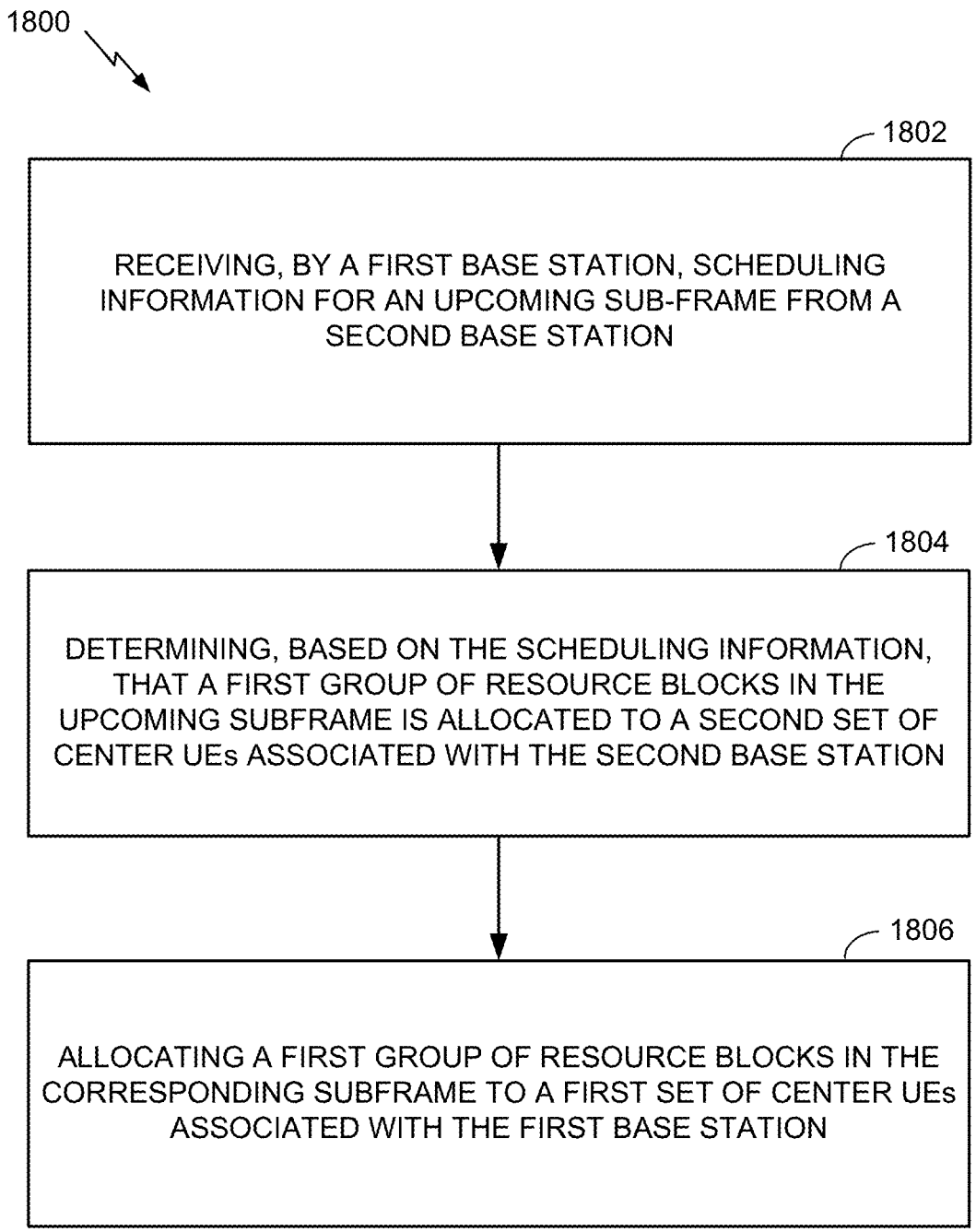
FIG. 18 illustrates another embodiment of methodologies for allocating sub-frames in a LAA network.

FIG. 18 illustrates other embodiments of methodologies for allocating subframes in a licensed assisted access (LAA) network. The method may be performed by a wireless entity such as an eNB, femto access point, or the like. The method 1800 may include, at 1802, receiving, by a first base station, scheduling information for an upcoming subframe from a second base station. The method may include, at 1804, determining, based on the scheduling information, that a first group of resource blocks in the upcoming subframe is allocated to a second set of center UEs associated that are associated with the second base station. The method may include, at 1806, allocating a first group of resource blocks in the corresponding subframe to a first set of center UEs that are associated with the first base station.

Figure 19:
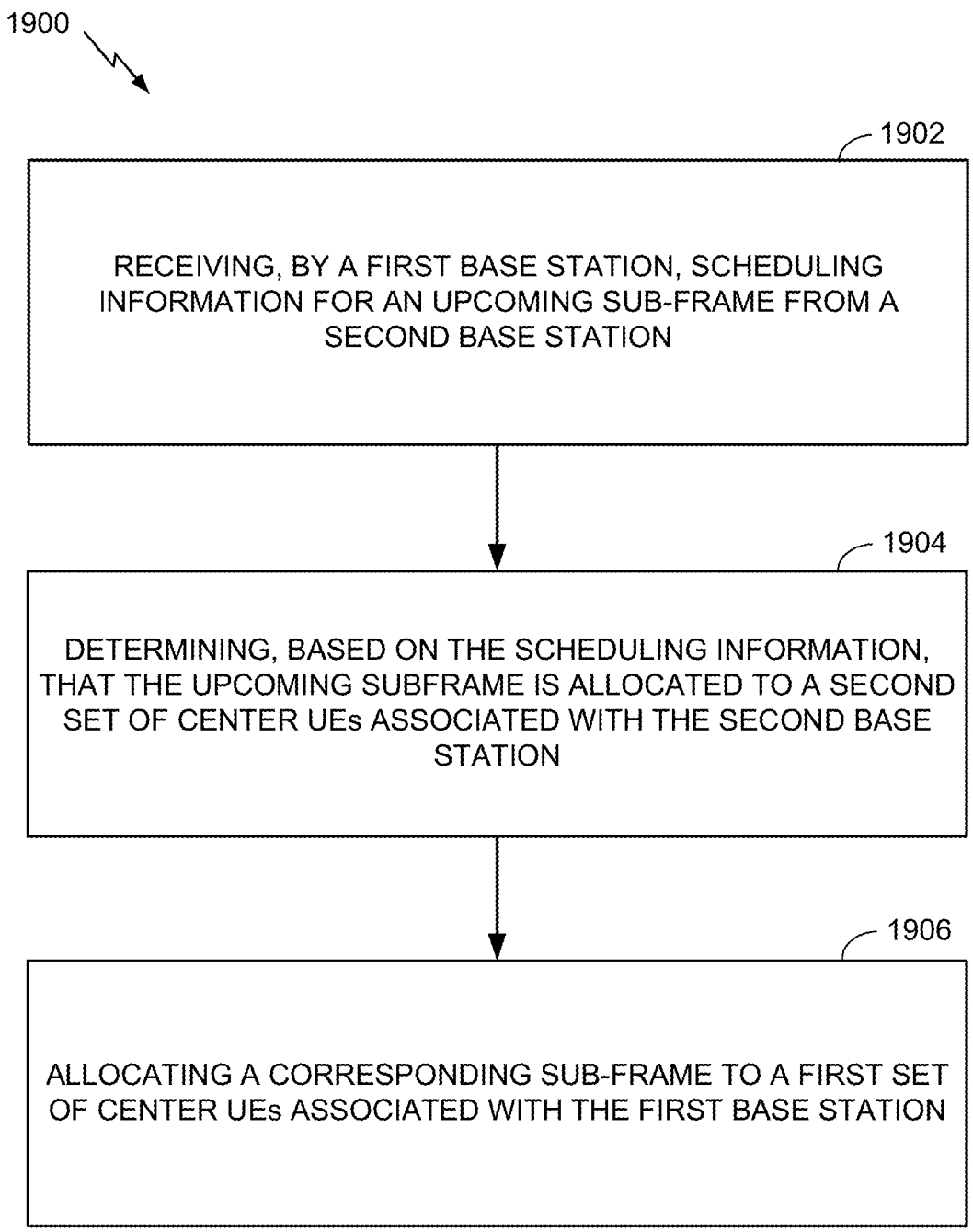
FIG. 19 illustrates another embodiment of methodologies for allocating sub-frames in a LAA network.

FIG. 19 illustrates other embodiments of methodologies for allocating subframes in a licensed assisted access (LAA) network. The method may be performed by a wireless entity such as an eNB, femto access point, or the like. The method 1900 may include, at 1902, receiving, by a first base station, scheduling information for an upcoming subframe from a second base station. The method may include, at 1904, determining, based on the scheduling information, that the upcoming subframe is allocated to a second set of center UEs that are associated with the second base station. The method may include, at 1906, allocating a corresponding subframe to a first set of edge UEs that are associated with the first base station.

Figure 20:
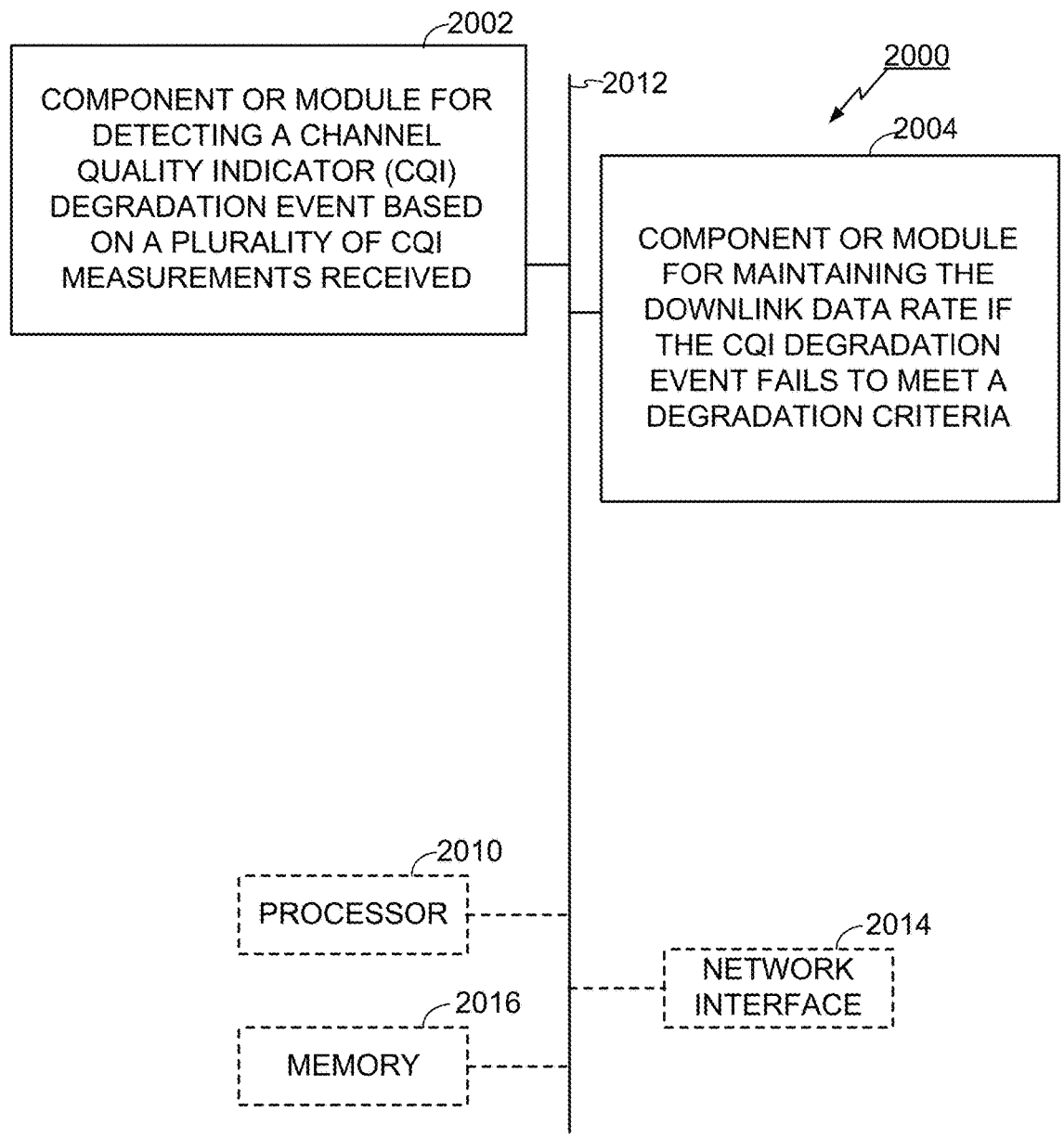
FIG. 20 illustrates an example apparatus for implementing the methodology of FIG. 9.

With reference to FIG. 20, there is provided an exemplary apparatus 2000 that may be configured as a wireless entity such as an eNB, femto access point, or other suitable entity, or as a processor, component or similar device for use within the mobile entity, eNB, femto access point, or other suitable entity, for controlling downlink data rate in a LAA network. The apparatus 2000 may include functional blocks that can represent functions implemented by a processor, software, or combinations thereof (e.g. firmware).

As illustrated, in one embodiment, the apparatus 2000 may include an electrical component or module 2002 for detecting a channel quality indicator (CQI) degradation event based on a plurality of CQI measurements received. The apparatus 2000 may include an electrical component or module 2004 for maintaining the downlink data rate if the CQI degradation event fails to meet a degradation criteria.

In related aspects, the apparatus 2000 may optionally include a processor component 2010 having at least one processor, in the case of the apparatus 2000 configured as a network entity. The processor 2010, in such case, may be operative communication with the components 2002-2004 or similar components via a bus 2012 or similar communication coupling. The processor 2010 may effect initiation and scheduling of the processes or functions performed by electrical components or modules 2002-2004.

In further related aspects, the apparatus 2000 may include a network interface component 2014 for communicating with other network entities. The apparatus 2000 may optionally include a component for storing information, such as, for example, a memory device/component 2016. The computer readable medium or the memory component 2016 may be operatively coupled to the other components of the apparatus 2000 via the bus 2012 or the like. The memory component 2016 may be adapted to store computer readable instructions and data for performing the activity of the components 2002-2004, and subcomponents thereof, or the processor 2010. The memory component 2016 may retain instructions for executing functions associated with the components 2002-2004. While shown as being external to the memory 2016, it is to be understood that the components 2002-2004 can exist within the memory 2016.

Figure 21:
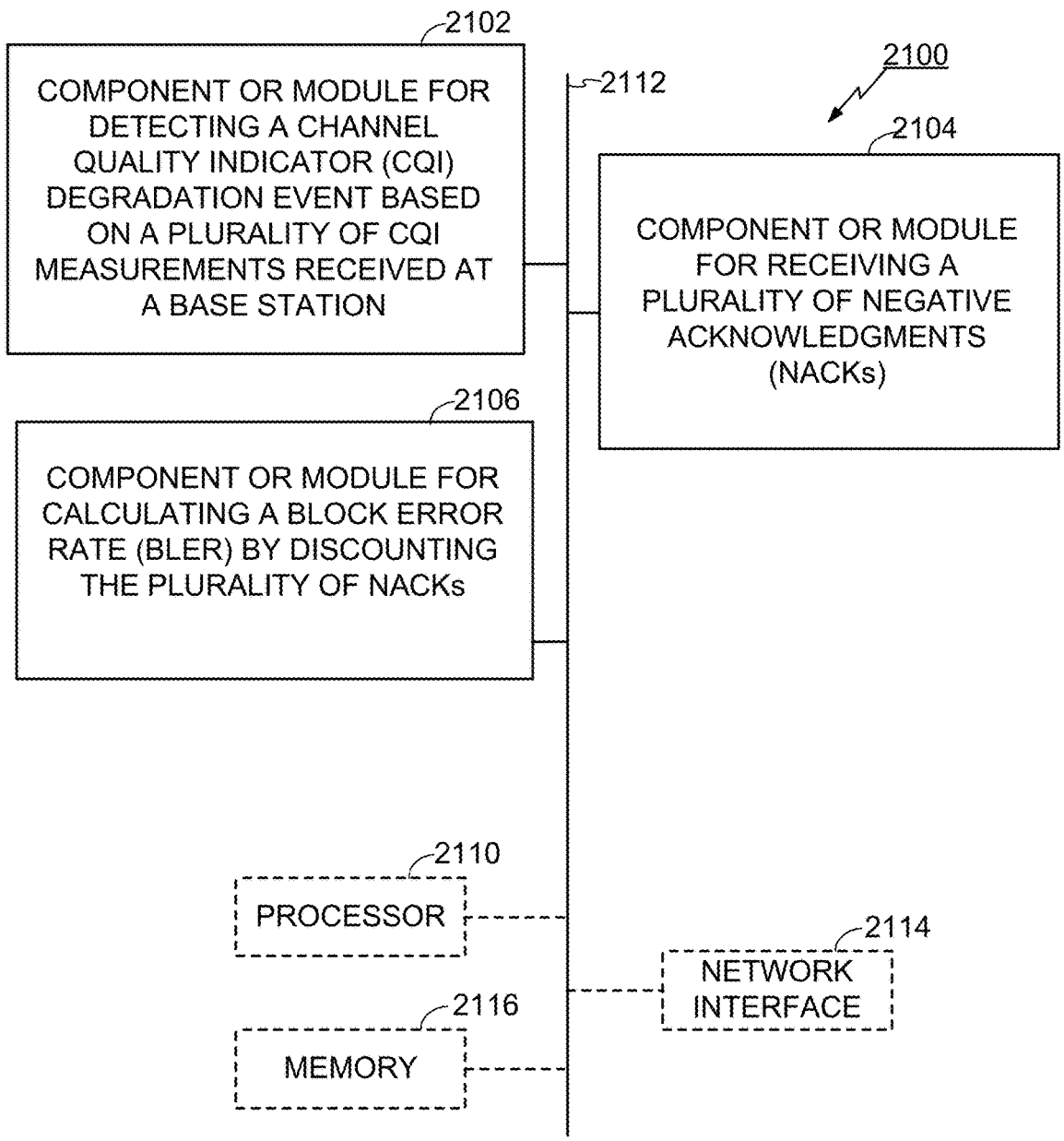
FIG. 21 illustrates an example apparatus for implementing the methodology of FIG. 10.

With reference to FIG. 21, there is provided an exemplary apparatus 2100 that may be configured as a wireless entity such as an eNB, femto access point, or other suitable entity, or as a processor, component or similar device for use within the mobile entity, eNB, femto access point, or other suitable entity, for controlling downlink data rate in a LAA network. The apparatus 2100 may include functional blocks that can represent functions implemented by a processor, software, or combinations thereof (e.g. firmware).

As illustrated, in one embodiment, the apparatus 2100 may include an electrical component or module 2102 for detecting a channel quality indicator (CQI) degradation event based on a plurality of CQI measurements received. The apparatus 2100 may include an electrical component or module 2104 for receiving a plurality of negative acknowledgements (NACKs). The apparatus 2100 may include an electrical component or module 2106 for calculating a block error rate (BLER) by discounting the plurality of NACKs.

In related aspects, the apparatus 2100 may optionally include a processor component 2110 having at least one processor, in the case of the apparatus 2100 configured as a network entity. The processor 2110, in such case, may be operative communication with the components 2102-2106 or similar components via a bus 2112 or similar communication coupling. The processor 2110 may effect initiation and scheduling of the processes or functions performed by electrical components or modules 2102-2106.

In further related aspects, the apparatus 2100 may include a network interface component 2114 for communicating with other network entities. The apparatus 2100 may optionally include a component for storing information, such as, for example, a memory device/component 2116. The computer readable medium or the memory component 2116 may be operatively coupled to the other components of the apparatus 2100 via the bus 2112 or the like. The memory component 2116 may be adapted to store computer readable instructions and data for performing the activity of the components 2102-2106, and subcomponents thereof, or the processor 2110. The memory component 2116 may retain instructions for executing functions associated with the components 2102-2106. While shown as being external to the memory 2116, it is to be understood that the components 2102-2106 can exist within the memory 2116.

Figure 22:
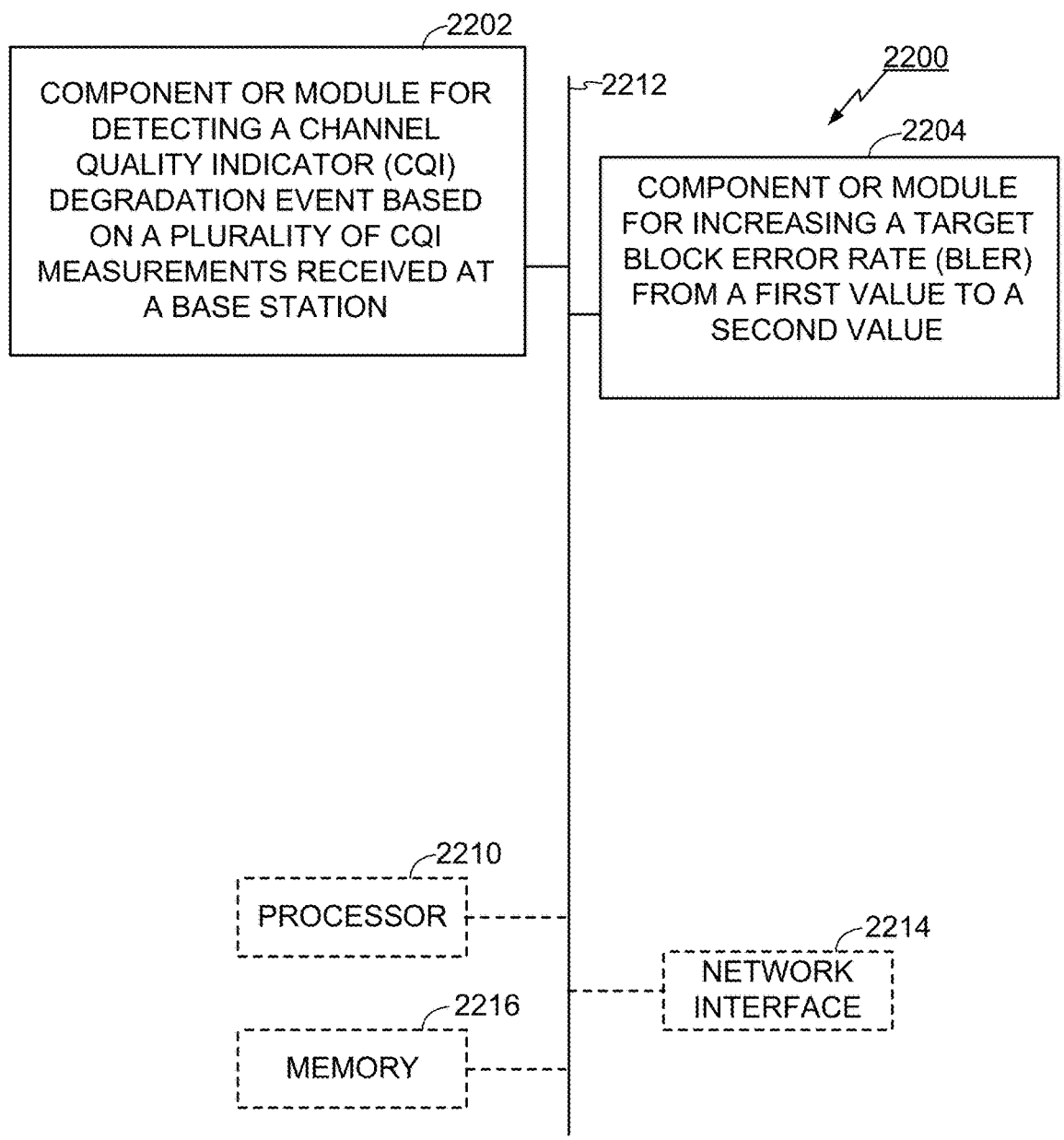
FIG. 22 illustrates an example apparatus for implementing the methodology of FIG. 11.

With reference to FIG. 22, there is provided an exemplary apparatus 2200 that may be configured as a wireless entity such as an eNB, femto access point, or other suitable entity, or as a processor, component or similar device for use within the mobile entity, eNB, femto access point, or other suitable entity, for controlling downlink data rate in a LAA network. The apparatus 2200 may include functional blocks that can represent functions implemented by a processor, software, or combinations thereof (e.g. firmware).

As illustrated, in one embodiment, the apparatus 2200 may include an electrical component or module 2202 for detecting a channel quality indicator (CQI) degradation event based on a plurality of CQI measurements received. The apparatus 2200 may include an electrical component or module 2204 for increasing a target block error rate (BLER) from a first value to a second value.

In related aspects, the apparatus 2200 may optionally include a processor component 2210 having at least one processor, in the case of the apparatus 2200 configured as a network entity. The processor 2210, in such case, may be operative communication with the components 2202-2204 or similar components via a bus 2212 or similar communication coupling. The processor 2210 may effect initiation and scheduling of the processes or functions performed by electrical components or modules 2202-2204.

In further related aspects, the apparatus 2200 may include a network interface component 2214 for communicating with other network entities. The apparatus 2200 may optionally include a component for storing information, such as, for example, a memory device/component 2216. The computer readable medium or the memory component 2216 may be operatively coupled to the other components of the apparatus 2200 via the bus 2212 or the like. The memory component 2216 may be adapted to store computer readable instructions and data for performing the activity of the components 2202-2204, and subcomponents thereof, or the processor 2210. The memory component 2216 may retain instructions for executing functions associated with the components 2202-2204. While shown as being external to the memory 2216, it is to be understood that the components 2202-2204 can exist within the memory 2216.

Figure 23:
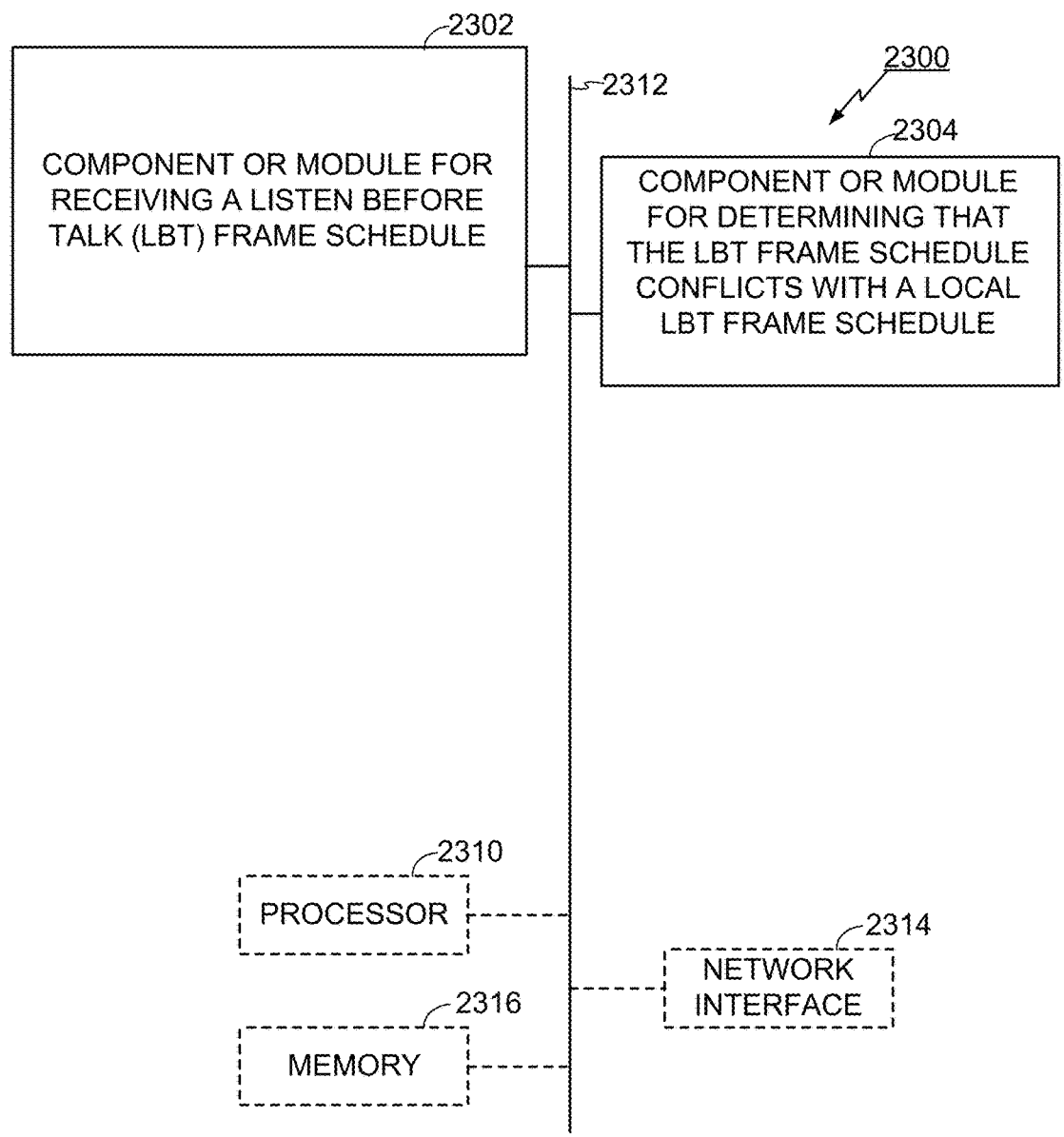
FIG. 23 illustrates an example apparatus for implementing the methodology of FIG. 12.

With reference to FIG. 23, there is provided an exemplary apparatus 2300 that may be configured as a wireless entity such as an eNB, femto access point, or other suitable entity, or as a processor, component or similar device for use within the mobile entity, eNB, femto access point, or other suitable entity, for controlling downlink data rate in a LAA network. The apparatus 2300 may include functional blocks that can represent functions implemented by a processor, software, or combinations thereof (e.g. firmware).

As illustrated, in one embodiment, the apparatus 2300 may include an electrical component or module 2302 for receiving a listen before talk (LBT) frame schedule. The apparatus 2300 may include an electrical component or module 2304 for determining that the LBT frame schedule conflicts with a local LBT frame schedule.

In related aspects, the apparatus 2300 may optionally include a processor component 2310 having at least one processor, in the case of the apparatus 2300 configured as a network entity. The processor 2310, in such case, may be operative communication with the components 2302-2304 or similar components via a bus 2312 or similar communication coupling. The processor 2310 may effect initiation and scheduling of the processes or functions performed by electrical components or modules 2302-2304.

In further related aspects, the apparatus 2300 may include a network interface component 2314 for communicating with other network entities. The apparatus 2300 may optionally include a component for storing information, such as, for example, a memory device/component 2316. The computer readable medium or the memory component 2316 may be operatively coupled to the other components of the apparatus 2300 via the bus 2312 or the like. The memory component 2316 may be adapted to store computer readable instructions and data for performing the activity of the components 2302-2304, and subcomponents thereof, or the processor 2310. The memory component 2316 may retain instructions for executing functions associated with the components 2302-2304. While shown as being external to the memory 2316, it is to be understood that the components 2302-2304 can exist within the memory 2316.

Figure 24:
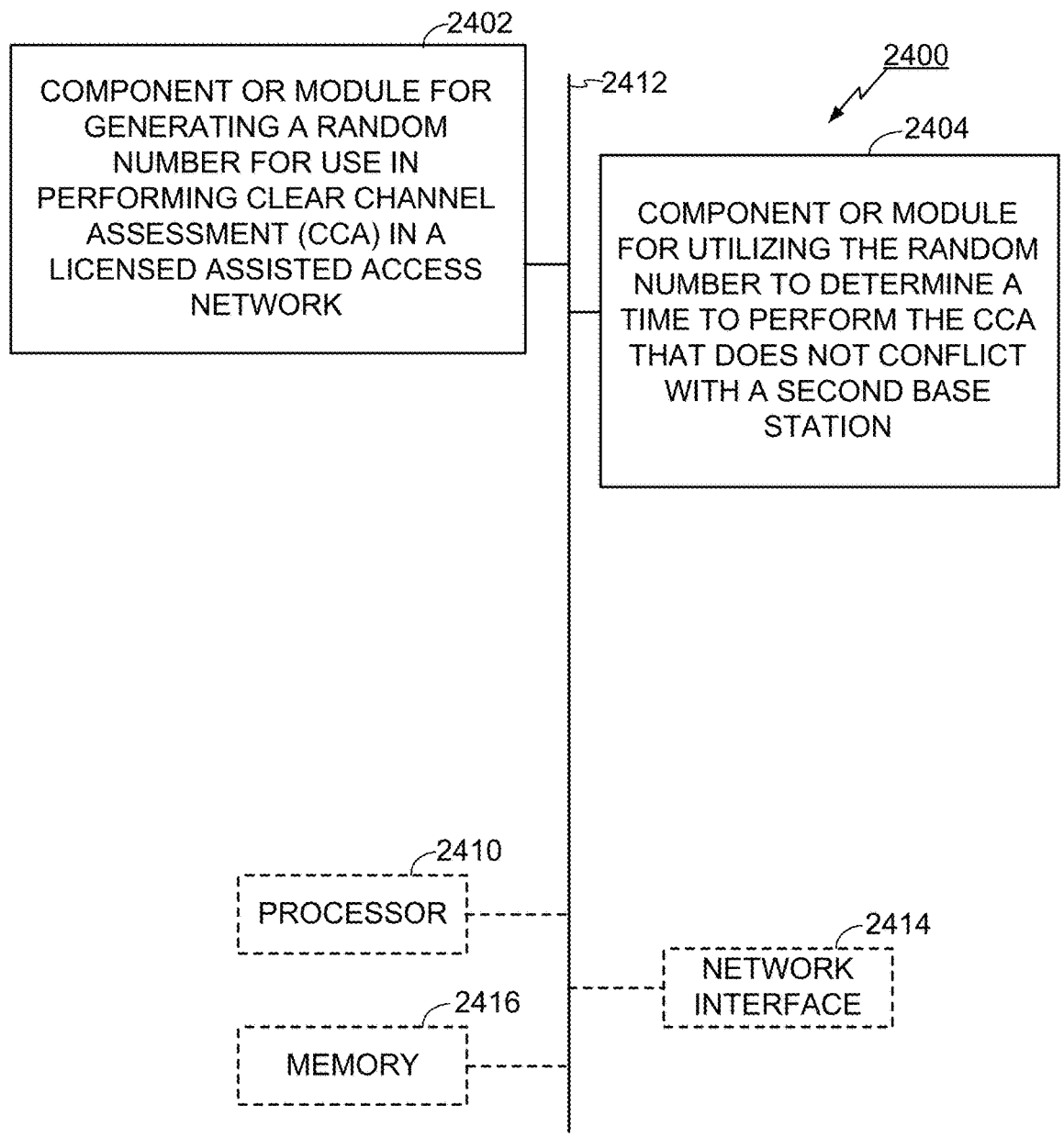
FIG. 24 illustrates an example apparatus for implementing the methodology of FIG. 13.

With reference to FIG. 24, there is provided an exemplary apparatus 2400 that may be configured as a wireless entity such as an eNB, femto access point, or other suitable entity, or as a processor, component or similar device for use within the mobile entity, eNB, femto access point, or other suitable entity, for time division multiplexing in a licensed assisted access network. The apparatus 2400 may include functional blocks that can represent functions implemented by a processor, software, or combinations thereof (e.g. firmware).

As illustrated, in one embodiment, the apparatus 2400 may include an electrical component or module 2402 for generating a random number for use in performing clear channel assessment (CCA) in a LAA network. The apparatus 2400 may include an electrical component or module 2404 for utilizing the random number to determine a time to perform the CCA that does not conflict with a second base station.

In related aspects, the apparatus 2400 may optionally include a processor component 2410 having at least one processor, in the case of the apparatus 2400 configured as a network entity. The processor 2410, in such case, may be operative communication with the components 2402-2404 or similar components via a bus 2412 or similar communication coupling. The processor 2410 may effect initiation and scheduling of the processes or functions performed by electrical components or modules 2402-2404.

In further related aspects, the apparatus 2400 may include a network interface component 2414 for communicating with other network entities. The apparatus 2400 may optionally include a component for storing information, such as, for example, a memory device/component 2416. The computer readable medium or the memory component 2416 may be operatively coupled to the other components of the apparatus 2400 via the bus 2412 or the like. The memory component 2416 may be adapted to store computer readable instructions and data for performing the activity of the components 2402-2404, and subcomponents thereof, or the processor 2410. The memory component 2416 may retain instructions for executing functions associated with the components 2402-2404. While shown as being external to the memory 2416, it is to be understood that the components 2402-2404 can exist within the memory 2416.

Figure 25:
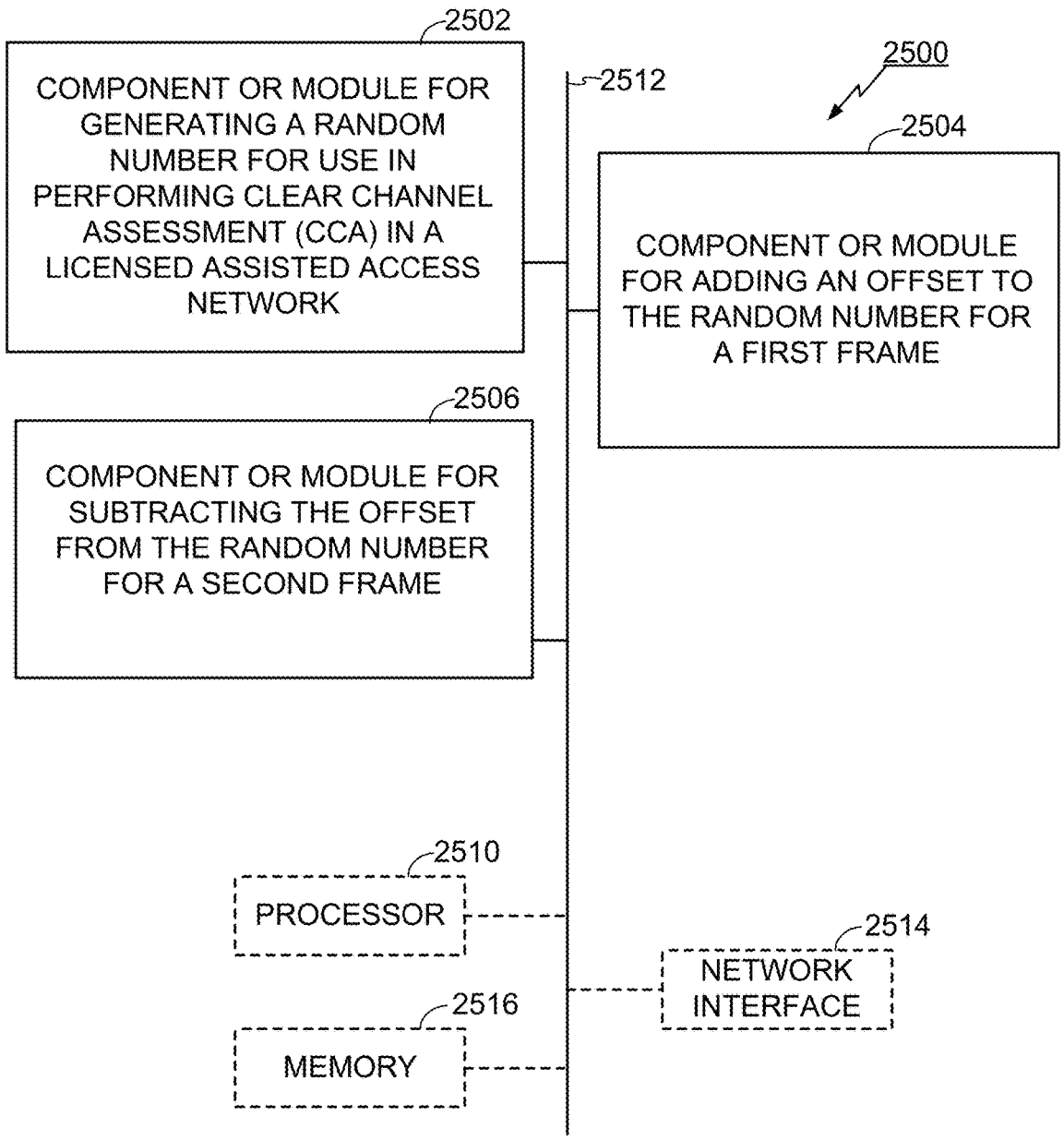
FIG. 25 illustrates an example apparatus for implementing the methodology of FIG. 14.

With reference to FIG. 25, there is provided an exemplary apparatus 2500 that may be configured as a wireless entity such as an eNB, femto access point, or other suitable entity, or as a processor, component or similar device for use within the mobile entity, eNB, femto access point, or other suitable entity, for time division multiplexing in a licensed assisted access network. The apparatus 2500 may include functional blocks that can represent functions implemented by a processor, software, or combinations thereof (e.g. firmware).

As illustrated, in one embodiment, the apparatus 2500 may include an electrical component or module 2502 for generating a random number for use in performing clear channel assessment (CCA) in a LAA network. The apparatus 2500 may include an electrical component or module 2504 for adding an offset to the random number for a first frame. The apparatus 2500 may include an electrical component or module 2506 for subtracting the offset from the random number for a second frame.

In related aspects, the apparatus 2500 may optionally include a processor component 2510 having at least one processor, in the case of the apparatus 2500 configured as a network entity. The processor 2510, in such case, may be operative communication with the components 2502-2506 or similar components via a bus 2512 or similar communication coupling. The processor 2510 may effect initiation and scheduling of the processes or functions performed by electrical components or modules 2502-2506.

In further related aspects, the apparatus 2500 may include a network interface component 2514 for communicating with other network entities. The apparatus 2500 may optionally include a component for storing information, such as, for example, a memory device/component 2516. The computer readable medium or the memory component 2516 may be operatively coupled to the other components of the apparatus 2500 via the bus 2512 or the like. The memory component 2516 may be adapted to store computer readable instructions and data for performing the activity of the components 2502-2506, and subcomponents thereof, or the processor 2510. The memory component 2516 may retain instructions for executing functions associated with the components 2502-2506. While shown as being external to the memory 2516, it is to be understood that the components 2502-2506 can exist within the memory 2516.

Figure 26:
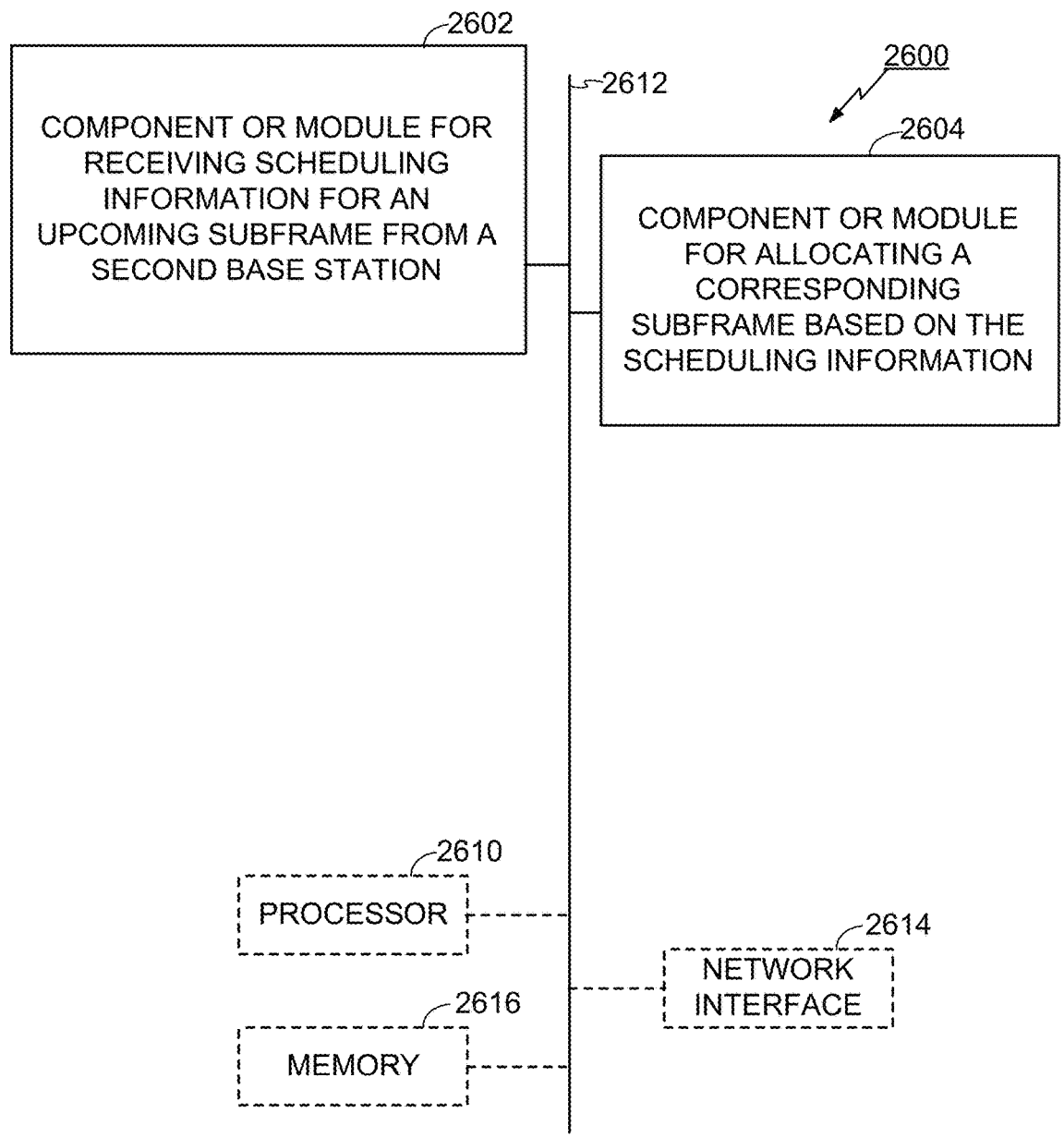
FIG. 26 illustrates an example apparatus for implementing the methodology of FIG. 15.

With reference to FIG. 26, there is provided an exemplary apparatus 2600 that may be configured as a wireless entity such as an eNB, femto access point, or other suitable entity, or as a processor, component or similar device for use within the mobile entity, eNB, femto access point, or other suitable entity, for allocating subframes in a licensed assisted access network. The apparatus 2600 may include functional blocks that can represent functions implemented by a processor, software, or combinations thereof (e.g. firmware).

As illustrated, in one embodiment, the apparatus 2600 may include an electrical component or module 2602 for receiving scheduling information for an upcoming subframe from a second base station. The apparatus 2600 may include an electrical component or module 2604 for allocating a corresponding subframe based on the scheduling information.

In related aspects, the apparatus 2600 may optionally include a processor component 2610 having at least one processor, in the case of the apparatus 2600 configured as a network entity. The processor 2610, in such case, may be operative communication with the components 2602-2604 or similar components via a bus 2612 or similar communication coupling. The processor 2610 may effect initiation and scheduling of the processes or functions performed by electrical components or modules 2602-2604.

In further related aspects, the apparatus 2600 may include a network interface component 2614 for communicating with other network entities. The apparatus 2600 may optionally include a component for storing information, such as, for example, a memory device/component 2616. The computer readable medium or the memory component 2616 may be operatively coupled to the other components of the apparatus 2600 via the bus 2612 or the like. The memory component 2616 may be adapted to store computer readable instructions and data for performing the activity of the components 2602-2604, and subcomponents thereof, or the processor 2610. The memory component 2616 may retain instructions for executing functions associated with the components 2602-2604. While shown as being external to the memory 2616, it is to be understood that the components 2602-2604 can exist within the memory 2616.

Figure 27:
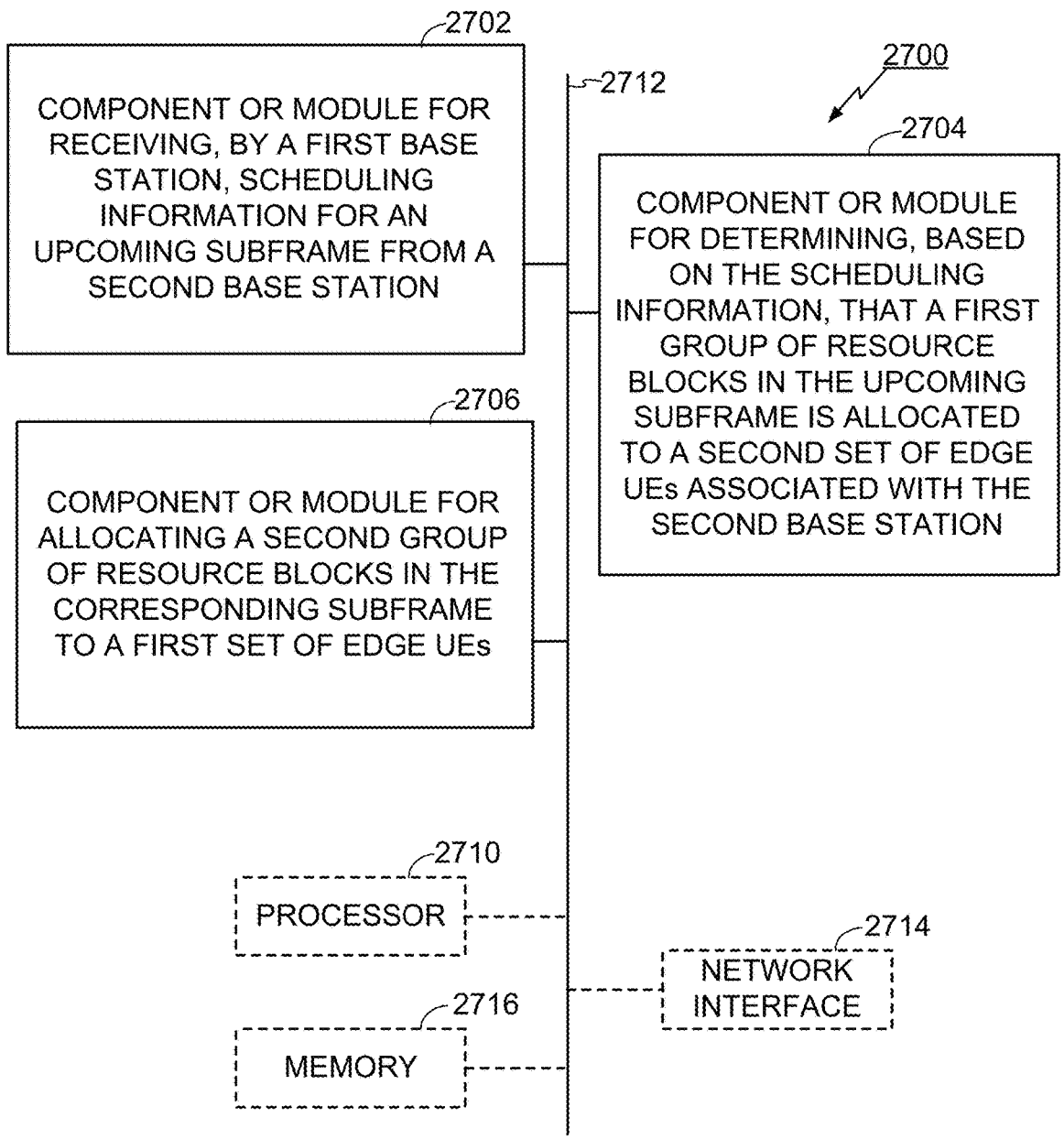
FIG. 27 illustrates an example apparatus for implementing the methodology of FIG. 16.

With reference to FIG. 27, there is provided an exemplary apparatus 2700 that may be configured as a wireless entity such as an eNB, femto access point, or other suitable entity, or as a processor, component or similar device for use within the mobile entity, eNB, femto access point, or other suitable entity, for allocating subframes in a licensed assisted access network. The apparatus 2700 may include functional blocks that can represent functions implemented by a processor, software, or combinations thereof (e.g. firmware).

As illustrated, in one embodiment, the apparatus 2700 may include an electrical component or module 2702 for receiving scheduling information for an upcoming subframe from a second base station. The apparatus 2700 may include an electrical component or module 2704 for determining that a first group of resource blocks in the upcoming subframe is allocated to a second set of edge UEs associated with the second base station. The apparatus 2700 may include an electrical component or module 2706 for allocating a second group of resource blocks in the corresponding subframe to a first set of edge UEs.

In related aspects, the apparatus 2700 may optionally include a processor component 2710 having at least one processor, in the case of the apparatus 2700 configured as a network entity. The processor 2710, in such case, may be operative communication with the components 2702-2706 or similar components via a bus 2712 or similar communication coupling. The processor 2710 may effect initiation and scheduling of the processes or functions performed by electrical components or modules 2702-2706.

In further related aspects, the apparatus 2700 may include a network interface component 2714 for communicating with other network entities. The apparatus 2700 may optionally include a component for storing information, such as, for example, a memory device/component 2716. The computer readable medium or the memory component 2716 may be operatively coupled to the other components of the apparatus 2700 via the bus 2712 or the like. The memory component 2716 may be adapted to store computer readable instructions and data for performing the activity of the components 2702-2706, and subcomponents thereof, or the processor 2710. The memory component 2716 may retain instructions for executing functions associated with the components 2702-2706. While shown as being external to the memory 2716, it is to be understood that the components 2702-2706 can exist within the memory 2716.

Figure 28:
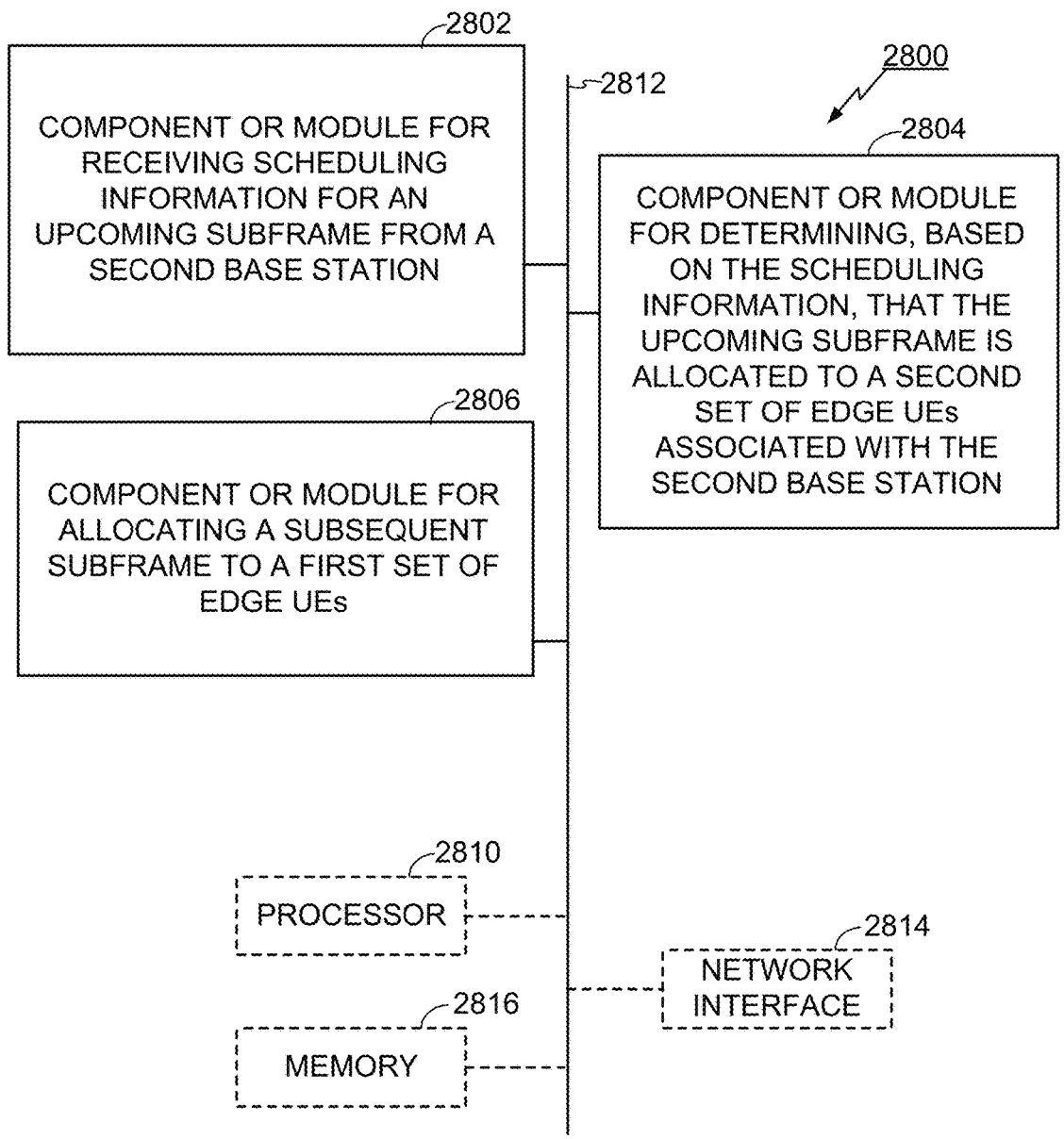
FIG. 28 illustrates an example apparatus for implementing the methodology of FIG. 17.

With reference to FIG. 28, there is provided an exemplary apparatus 2800 that may be configured as a wireless entity such as an eNB, femto access point, or other suitable entity, or as a processor, component or similar device for use within the mobile entity, eNB, femto access point, or other suitable entity, for allocating subframes in a licensed assisted access network. The apparatus 2800 may include functional blocks that can represent functions implemented by a processor, software, or combinations thereof (e.g. firmware).

As illustrated, in one embodiment, the apparatus 2800 may include an electrical component or module 2802 for receiving scheduling information for an upcoming subframe from a second base station. The apparatus 2800 may include an electrical component or module 2804 for determining that the upcoming subframe is allocated to a second set of edge UEs associated with the second base station. The apparatus 2800 may include an electrical component or module 2806 for allocating a subsequent subframe to a first set of edge UEs.

In related aspects, the apparatus 2800 may optionally include a processor component 2810 having at least one processor, in the case of the apparatus 2800 configured as a network entity. The processor 2810, in such case, may be operative communication with the components 2802-2806 or similar components via a bus 2812 or similar communication coupling. The processor 2810 may effect initiation and scheduling of the processes or functions performed by electrical components or modules 2802-2806.

In further related aspects, the apparatus 2800 may include a network interface component 2814 for communicating with other network entities. The apparatus 2800 may optionally include a component for storing information, such as, for example, a memory device/component 2816. The computer readable medium or the memory component 2816 may be operatively coupled to the other components of the apparatus 2800 via the bus 2812 or the like. The memory component 2816 may be adapted to store computer readable instructions and data for performing the activity of the components 2802-2806, and subcomponents thereof, or the processor 2810. The memory component 2816 may retain instructions for executing functions associated with the components 2802-2806. While shown as being external to the memory 2816, it is to be understood that the components 2802-2806 can exist within the memory 2816.

Figure 29:
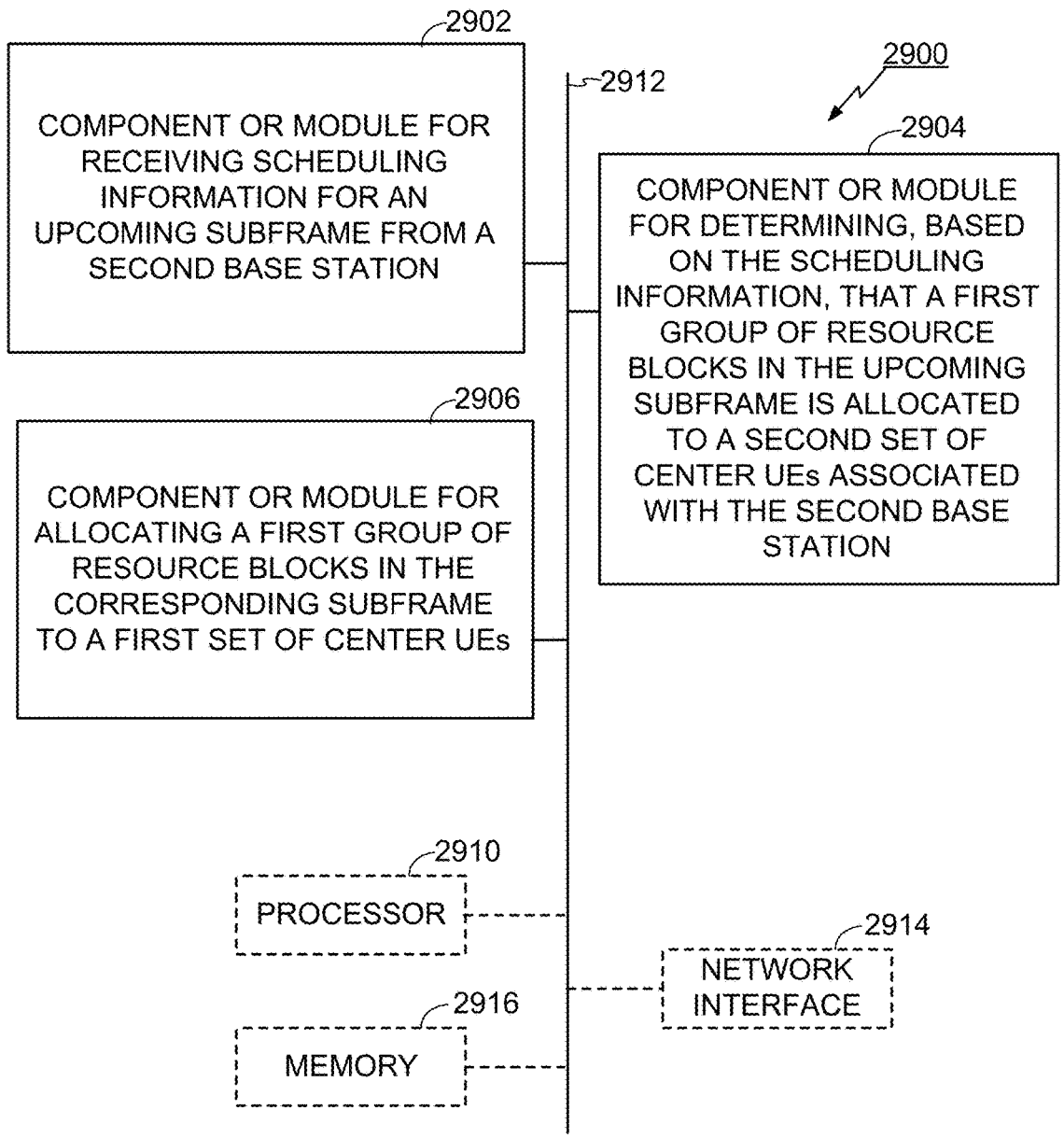
FIG. 29 illustrates an example apparatus for implementing the methodology of FIG. 18.

With reference to FIG. 29, there is provided an exemplary apparatus 2900 that may be configured as a wireless entity such as an eNB, femto access point, or other suitable entity, or as a processor, component or similar device for use within the mobile entity, eNB, femto access point, or other suitable entity, for allocating subframes in a licensed assisted access network. The apparatus 2900 may include functional blocks that can represent functions implemented by a processor, software, or combinations thereof (e.g. firmware).

As illustrated, in one embodiment, the apparatus 2900 may include an electrical component or module 2902 for receiving scheduling information for an upcoming subframe from a second base station. The apparatus 2900 may include an electrical component or module 2904 for determining that a first group of resource blocks in the upcoming subframe is allocated to a second set of center UEs associated with the second base station. The apparatus 2900 may include an electrical component or module 2906 for allocating a first group of resource blocks in the corresponding subframe to a first set of center UEs.

In related aspects, the apparatus 2900 may optionally include a processor component 2910 having at least one processor, in the case of the apparatus 2900 configured as a network entity. The processor 2910, in such case, may be operative communication with the components 2902-2906 or similar components via a bus 2912 or similar communication coupling. The processor 2910 may effect initiation and scheduling of the processes or functions performed by electrical components or modules 2902-2906.

In further related aspects, the apparatus 2900 may include a network interface component 2914 for communicating with other network entities. The apparatus 2900 may optionally include a component for storing information, such as, for example, a memory device/component 2916. The computer readable medium or the memory component 2916 may be operatively coupled to the other components of the apparatus 2900 via the bus 2912 or the like. The memory component 2916 may be adapted to store computer readable instructions and data for performing the activity of the components 2902-2906, and subcomponents thereof, or the processor 2910. The memory component 2916 may retain instructions for executing functions associated with the components 2902-2906. While shown as being external to the memory 2916, it is to be understood that the components 2902-2906 can exist within the memory 2916.

Figure 30:
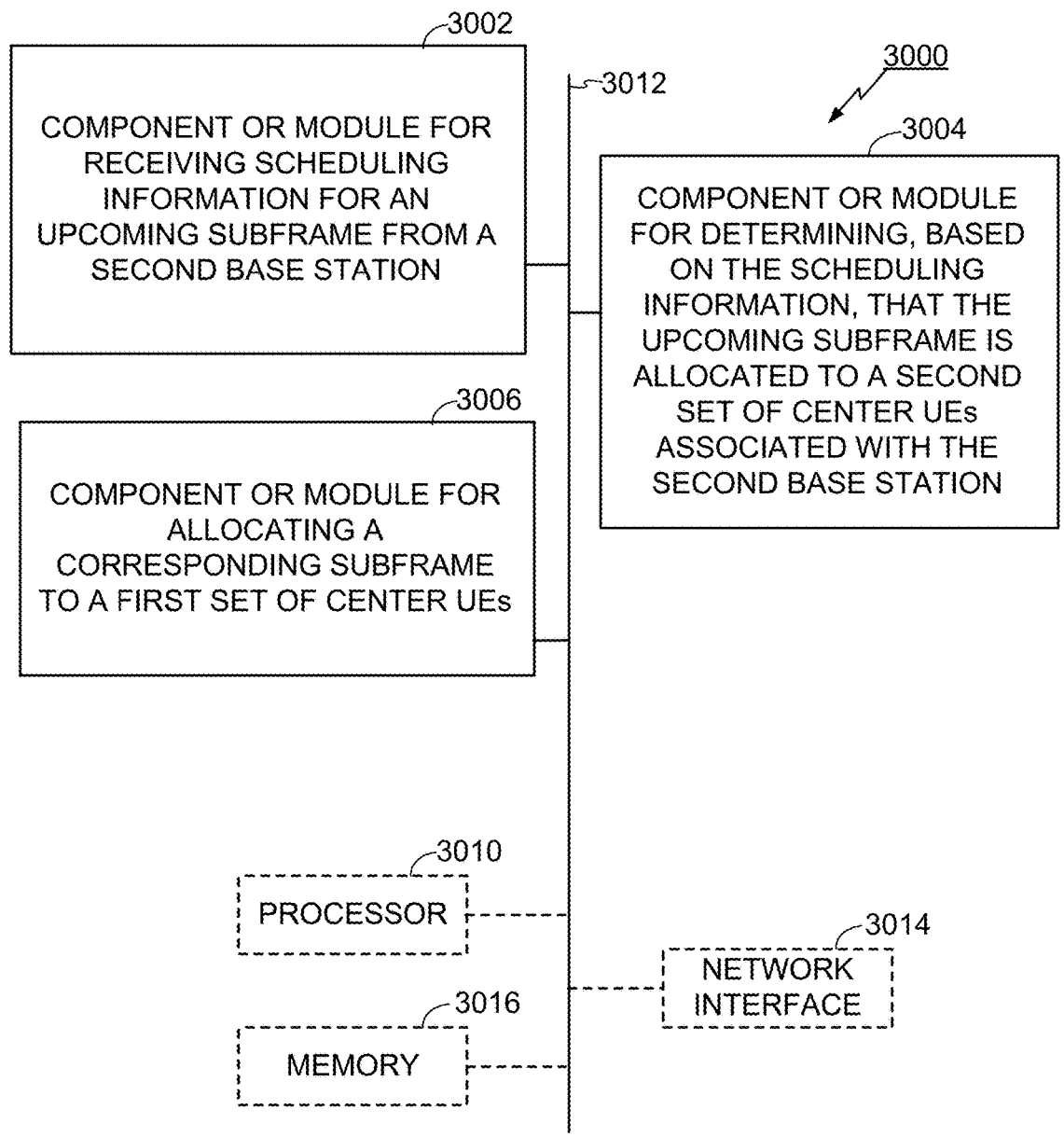
FIG. 30 illustrates an example apparatus for implementing the methodology of FIG. 19.

With reference to FIG. 30, there is provided an exemplary apparatus 3000 that may be configured as a wireless entity such as an eNB, femto access point, or other suitable entity, or as a processor, component or similar device for use within the mobile entity, eNB, femto access point, or other suitable entity, for allocating subframes in a licensed assisted access network. The apparatus 3000 may include functional blocks that can represent functions implemented by a processor, software, or combinations thereof (e.g. firmware).

As illustrated, in one embodiment, the apparatus 3000 may include an electrical component or module 3002 for receiving scheduling information for an upcoming subframe from a second base station. The apparatus 3000 may include an electrical component or module 3004 for determining that the upcoming subframe is allocated to a second set of center UEs associated with the second base station. The apparatus 3000 may include an electrical component or module 3006 for allocating a corresponding subframe to a first set of center UEs.

In related aspects, the apparatus 3000 may optionally include a processor component 3010 having at least one processor, in the case of the apparatus 3000 configured as a network entity. The processor 3010, in such case, may be operative communication with the components 3002-3006 or similar components via a bus 3012 or similar communication coupling. The processor 3010 may effect initiation and scheduling of the processes or functions performed by electrical components or modules 3002-3006.

In further related aspects, the apparatus 3000 may include a network interface component 3014 for communicating with other network entities. The apparatus 3000 may optionally include a component for storing information, such as, for example, a memory device/component 3016. The computer readable medium or the memory component 3016 may be operatively coupled to the other components of the apparatus 3000 via the bus 3012 or the like. The memory component 3016 may be adapted to store computer readable instructions and data for performing the activity of the components 3002-3006, and subcomponents thereof, or the processor 3010. The memory component 3016 may retain instructions for executing functions associated with the components 3002-3006. While shown as being external to the memory 3016, it is to be understood that the components 3002-3006 can exist within the memory 3016.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

We claim:

1. A method for wireless communication, comprising:
   determining, by a base station, a random number to be used in association with performing a clear channel assessment (CCA) in a licensed assisted access (LAA) network,
      the random number being determined in coordination with one or more other random numbers determined by one or more other base stations;
   modifying, by the base station, the random number using an offset value; and
   determining, by the base station and based on modifying the random number using the offset value, a time to perform the CCA.

2. The method of claim 1, wherein modifying the random number comprises:
   adding the offset value to the random number, or
   subtracting the offset value from the random number.

3. The method of claim 1,
wherein modifying the random number comprises:
adding the offset value to the random number for a first frame, and
wherein the method further comprises
subtracting the offset value from the random number for a second frame.

4. The method of claim 1, wherein the base station and the one or more other base stations are within communication range of a same user equipment (UE).

5. The method of claim 1, further comprising:
selecting a number set from a plurality of number sets, wherein each number set in the plurality of number sets includes a unique group of numbers, and wherein the random number is determined based on the number set.

6. The method of claim 5, wherein the number set is selected based on an identification number corresponding to the base station.

7. The method of claim 1, wherein determining the random number comprises selecting the random number from one of a plurality of sets of numbers that each includes a unique number at a certain index of each of the plurality of sets of numbers.

8. The method of claim 1, further comprising:
receiving information that identifies the random number from at least one of the one or more other base stations.

9. The method of claim 1, further comprising:
detecting a channel quality indicator (CQI) degradation event; and
maintaining a downlink data rate, despite detecting the CQI degradation event, when one or more criteria are satisfied.

10. The method of claim 1, further comprising:
receiving, from a user equipment, an indication that the user equipment is undergoing interference; and
maintaining a downlink data rate based on the indication that the user equipment is undergoing interference.

11. A base station for wireless communication, comprising:
one or more processors configured to:
determine a random number to be used in association with performing a clear channel assessment (CCA) in a licensed assisted access (LAA) network,
the random number being determined in coordination with one or more other random numbers determined by one or more other base stations;
modify the random number using an offset value; and
determine, based on modifying the random number using the offset value, a time to perform the CCA.

12. The base station of claim 11, wherein, when modifying the random number, the one or more processors are configured to:
add the offset value to the random number.

13. The base station of claim 11, wherein the base station and the one or more other base stations are within communication range of a same user equipment (UE).

14. The base station of claim 11,
wherein the one or more processors are further configured to:
select a number set from a plurality of number sets, wherein each number set in the plurality of number sets includes a unique group of numbers; and
wherein, when determining the random number, the one or more processors are configured to:
determine the random number based on the number set.

15. The base station of claim 14, wherein the number set is selected based on an identification number corresponding to the base station.

16. The base station of claim 11, wherein the one or more processors, when determining the random number, are configured to:
select the random number from one of a plurality of sets of numbers that each includes a unique number at a certain index of each of the plurality of sets of numbers.

17. An apparatus for wireless communication, comprising:
means for determining a random number to be used in association with performing a clear channel assessment (CCA) in a licensed assisted access (LAA) network,
the random number being determined in coordination with one or more other random numbers determined by one or more other apparatuses; means for determining, based on the random number, a time to perform the CCA;
means for detecting a channel quality indicator (CQI) degradation event; and
means for maintaining a downlink data rate despite detecting the CQI degradation.

18. The apparatus of claim 17, further comprising:
means for modifying the random number using an offset value.

19. The apparatus of claim 18, wherein the means for modifying the random number comprises:
means for adding the offset value to the random number, or
means for subtracting the offset value from the random number.

20. The apparatus of claim 17, further comprising:
means for adding an offset value to the random number for a first frame; and
means for subtracting the offset value from the random number for a second frame.

21. The apparatus of claim 17, wherein the means for maintaining the downlink data rate comprises:
means for maintaining the downlink data rate, despite detecting the CQI degradation event, when one or more criteria are satisfied.

22. The apparatus of claim 17, further comprising:
means for receiving, from a user equipment, an indication that the user equipment is undergoing interference,
wherein the means for maintaining the downlink data rate comprises:
means for maintaining the downlink data rate based on the indication that the user equipment is undergoing interference.

23. A non-transitory computer-readable medium storing instructions for wireless communication, the instructions comprising:
one or more instructions that, when executed by one or more processors of a base station, cause the one or more processor to:
determine a random number to be used in association with performing a clear channel assessment (CCA) in a licensed assisted access (LAA) network,
the random number being determined in coordination with one or more other random numbers determined by one or more other base stations;
determine, based on the random number, a time to perform the CCA
detect a channel quality indicator (CQI) degradation event; and maintain a downlink data rate despite detecting the CQI degradation.

24. The non-transitory computer-readable medium of claim 23,
wherein the one or more instructions, when executed by the one or more processors, cause the one or more processors to:
select a number set from a plurality of number sets,
wherein each number set in the plurality of number sets includes a unique group of numbers, and
wherein the one or more instructions, that cause the one or more processors to determine the random number, cause the one or more processors to:
determine the random number based on the number set.

25. The non-transitory computer-readable medium of claim 24, wherein the number set is selected based on an identification number corresponding to the base station.

26. The non-transitory computer-readable medium of claim 23, wherein the one or more instructions, that cause the one or more processors to determine the random number, cause the one or more processors to:
select the random number from one of a plurality of sets of numbers that each includes a unique number at a certain index of each of the plurality of sets of numbers.

27. The non-transitory computer-readable medium of claim 23, wherein the one or more instructions, when executed by the one or more processors, cause the one or more processors to:
receive information that identifies the random number from at least one of the one or more other base stations.

28. The non-transitory computer-readable medium of claim 23, wherein the one or more instructions, when executed by the one or more processors, cause the one or more processors to:
receive, from a user equipment, an indication that the user equipment is undergoing interference.

29. The non-transitory computer-readable medium of claim 28, wherein the one or more instructions, that cause the one or more processors to maintain the downlink data rate, cause the one or more processors to:
maintain the downlink data rate based on the indication that the user equipment is undergoing interference.

30. The non-transitory computer-readable medium of claim 23, wherein the one or more instructions, when executed by the one or more processors, cause the one or more processors to:
modify the random number using an offset value.

\* \* \* \* \*